(12) United States Patent
Van Tellingen et al.

(10) Patent No.: US 12,551,471 B2
(45) Date of Patent: Feb. 17, 2026

(54) ABT-751 AND IONIZING RADIATION

(71) Applicant: Stichting Het Nederlands Kanker Instituut-Antoni van Leeuwenhoek Ziekenhuis, Amsterdam (NL)

(72) Inventors: Olaf Van Tellingen, Amsterdam (NL); Mark Cornelis De Gooijer, Amsterdam (NL)

(73) Assignee: Stichting Het Nederlands Kanker Instituut-Antoni van Leeuwenhoek Ziekenhuis, Amsterdam (NL)

( * ) Notice: Subject to any disclaimer, the term of this patent is extended or adjusted under 35 U.S.C. 154(b) by 666 days.

(21) Appl. No.: 17/792,915

(22) PCT Filed: Jan. 20, 2021

(86) PCT No.: PCT/NL2021/050035
§ 371 (c)(1),
(2) Date: Jul. 14, 2022

(87) PCT Pub. No.: WO2021/150109
PCT Pub. Date: Jul. 29, 2021

(65) Prior Publication Data
US 2023/0061353 A1    Mar. 2, 2023

(30) Foreign Application Priority Data

Jan. 22, 2020  (NL) .................................... 2024725
Nov. 2, 2020  (NL) .................................... 2026813

(51) Int. Cl.
| | | |
|---|---|---|
| *A61K 31/44* | (2006.01) | |
| *A61K 9/00* | (2006.01) | |
| *A61K 31/519* | (2006.01) | |
| *A61K 41/00* | (2020.01) | |
| *A61P 35/00* | (2006.01) | |

(52) U.S. Cl.
CPC ............ *A61K 31/44* (2013.01); *A61K 9/0053* (2013.01); *A61K 31/519* (2013.01); *A61K 41/0038* (2013.01); *A61P 35/00* (2018.01)

(58) Field of Classification Search
CPC .... A61K 31/44; A61K 31/519; A61K 9/0053; A61K 41/0038; A61P 35/00
See application file for complete search history.

(56) References Cited

U.S. PATENT DOCUMENTS 6,080,777 A    6/2000  Schiff

FOREIGN PATENT DOCUMENTS

WO    2016/144636    9/2016
WO    WO-2016144636 A1 *    9/2016   ......... A61K 31/4188

OTHER PUBLICATIONS

Jorgensen, Timothy J., et al. "Chemosensitization and radiosensitization of human lung and colon cancers by antimitotic agent, ABT-751, in athymic murine xenograft models of subcutaneous tumor growth." Cancer chemotherapy and pharmacology 59 (2007): 725-732. (Year: 2007).*
Siemann, Dietmar W. "The unique characteristics of tumor vasculature and preclinical evidence for its selective disruption by tumor-vascular disrupting agents." Cancer treatment reviews 37.1 (2011): 63-74. (Year: 2011).*
International Search Report & Written Opinion, International Patent Application No. PCT/NL2021/050035, mailed Mar. 29, 2021, 13 pages.
Timothy J. Jorgensen et al. "Chemosensitization and radiosensitization of human lung and colon cancers by antimitotic agent, ABT-751, in athymic murine xenograft models of subcutaneous tumor growth" Cancer Chemotherapy and Pharmacology, Springer, Berlin, DE, vol. 59, No. 6, Sep. 12, 2006, pp. 725-732.
Ryu S et al: "Estramustine: A novel radiation enhancer in human carcinoma cells" Oncology Biology Physics, Pergamon Press, USA, vol. 30, No. 1, Aug. 30, 1994, pp. 99-104.
Siemann et al: "The unique characteristics of tumor vasculature and preclinical evidence for its selective disruption by Tumor-Vascular Disrupting Agents" Cancer Treatment Reviews, Elsevier, Amsterdam, NL, vol. 37, No. 1, Feb. 1, 2011, pp. 63-74.
Galmarini C M: "ABT-751" Current Opinion in Investigational Drugs, Pharmapress, US, vol. 6, No. 6, Jan. 1, 2005, pp. 623-630.
Vaidhyanathan, S. et al."Factors Influencing the Central Nervous System Distribution of a Novel Phosphoinositide 3-Kinase/Mammalian Target . . . " The Journal of Pharmacology and Experimental Therapeutics, 356: 251-259, Feb. 2016.
Fox, Elizabeth et al. "Time to Disease Progression in Children with Relapsed or Refractory Neuroblastoma Treated with ABT-751: A Report from the Children's Oncology Group (ANBL0621)" Pediatr Blood Cancer 2014, 61: 990-996.

* cited by examiner

*Primary Examiner* — James H Alstrum-Acevedo
*Assistant Examiner* — Justin Christopher Sanchez
(74) *Attorney, Agent, or Firm* — Casimir Jones, S.C.; Robert A. Goetz

(57) ABSTRACT

The current invention relates to a combination therapy comprising administering the antimitotic agent ABT-751 to a subject and delivering ionizing radiation to the same subject for the treatment of a brain tumor. Provided is for ABT-751 and ionizing radiation for use in such treatments.

20 Claims, 22 Drawing Sheets orthotopic GSC457 brain tumors

ABT-751 AND IONIZING RADIATION

FIELD OF THE INVENTION

This invention pertains to a combination therapy comprising administering ABT-751 to a subject and delivering ionizing radiation to said subject for the treatment of a brain tumor.

BACKGROUND OF THE INVENTION

Malignancies in the brain, occurring either as primary brain tumor or secondary brain tumor, are among the most difficult cancers to treat.

Despite that over past decades there have been major improvements in understanding the biology of brain tumors the prognosis and survival of subjects with brain tumors is poor and has not improved substantially over the past decades. Thus, there is a great and unmet need for better therapies.

A key factor contributing to the poor prognosis and survival of brain tumors is that treatment options are limited. Surgery and radiotherapy are already utilized to-the-max and further intensification is restricted by glioma location and invasion into eloquent surrounding brain structures.

The options for therapeutic agents are also limited, because adequate delivery of many agents to the brain, for example to a tumor that is localized in the brain, is hindered by the blood-brain barrier.

In addition, traditional chemotherapeutic agents such as vincristine or temozolomide are cytotoxic and relatively non-selective for tumor cells, as these agents are intracellular poisons that for example cause DNA damage or interfere with intracellular processes, such as mitosis. The cytotoxicity of such chemotherapeutic agents is considered to be the upside as well as the downside as the mechanism by which such agents kill tumor cells is also the same mechanism causing severe toxic side effects.

In light of the limitations of present treatment options, novel products, compositions, methods and uses to treat a brain tumor in a subject are highly desirable, yet are not readily available. In particular there is a clear need for reliable, efficient and reproducible products, compositions, methods and uses that allow to effectively treat brain tumors while aiming to keep side-effects at a minimum. Accordingly, the technical problem underlying the present invention can been seen in the provision of such products, compositions, methods and uses for complying with any of the aforementioned needs. The technical problem is solved by the embodiments characterized in the claims and is provided herein below.

SUMMARY OF THE INVENTION

The invention relates to the use of ABT-751. It was surprisingly found that ABT-751 can penetrate the brain (cross the blood-brain barrier) and in such a manner that it can selectively increase the radiation sensitivity of dividing tumor cells present in the brain without increasing the damage to the surrounding non-dividing normal brain tissue. When given at the dose and schedule described herein ABT-751 causes little or no toxic side effect, while being able to elicit a pharmacodynamic effect in the brain tumor cells that sensitizes these cells to radiation.

The invention provides ABT-751 for use in the treatment of a brain tumor in a subject, wherein the treatment comprises administering ABT-751 to said subject and delivering ionizing radiation (IR) to said subject.

In an aspect of the invention ionizing radiation for use in the treatment of a brain tumor in a subject is provided, wherein the treatment comprises administering ABT-751 to said subject and delivering ionizing radiation to said subject as disclosed herein.

In a further aspect the invention provides a combination therapy for use in the treatment of a brain tumor in a subject, wherein the treatment comprises administering ABT-751 to said subject and delivering ionizing radiation to said subject as disclosed herein.

In another aspect the invention provides a method for the treatment of a brain tumor in a subject, the method comprising administering to said subject an effective amount of ABT-751 and delivering an effective amount of ionizing radiation to said subject as disclosed herein.

BRIEF DESCRIPTION OF THE DRAWINGS

Embodiments of the invention are further described hereinafter with reference to the accompanying drawings.

DEFINITIONS

Figure 1:
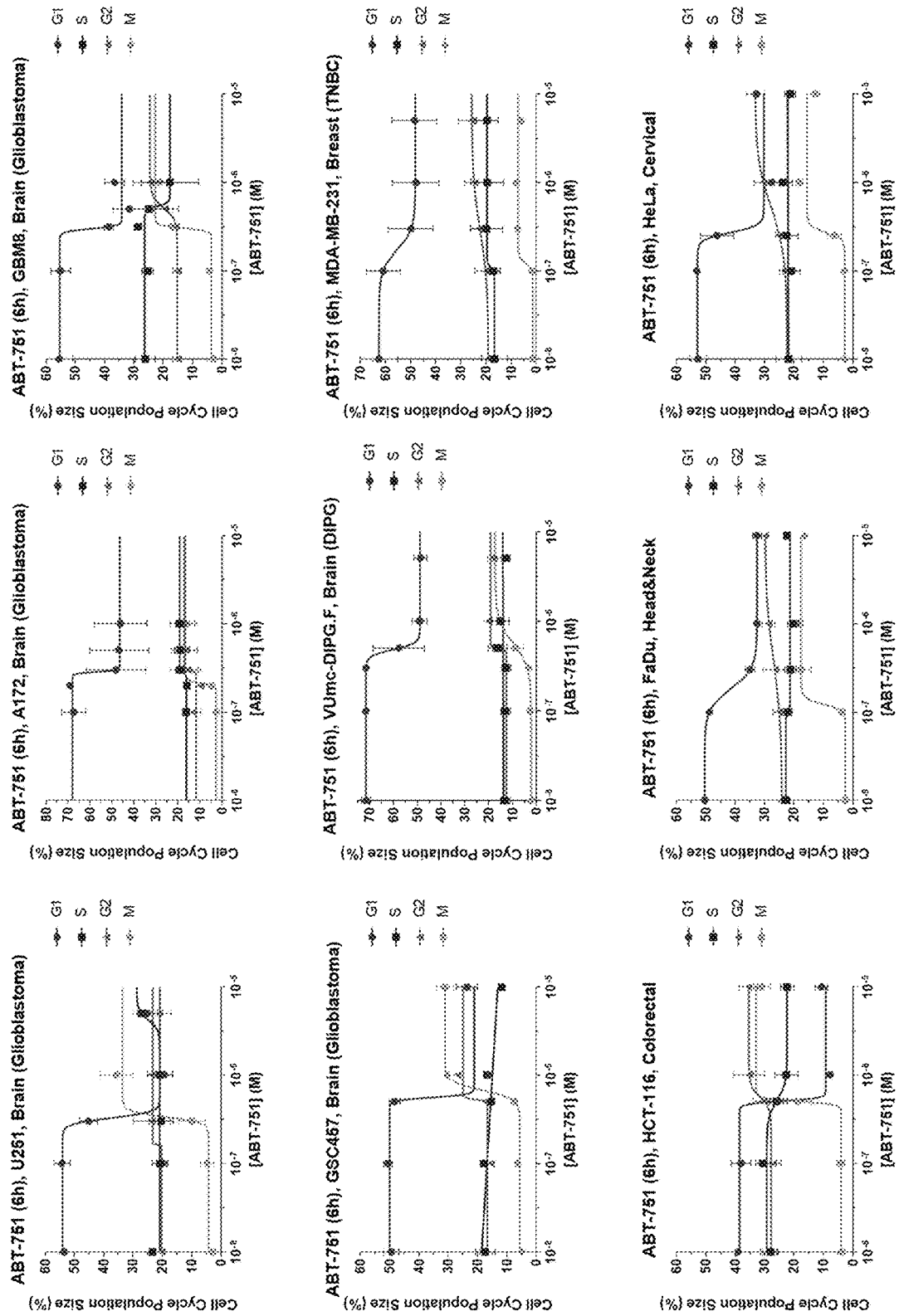
FIG. 1: ABT-751 dose-dependently increases the mitotic (M) population of cancer cell lines of various origins.
Figure 1:
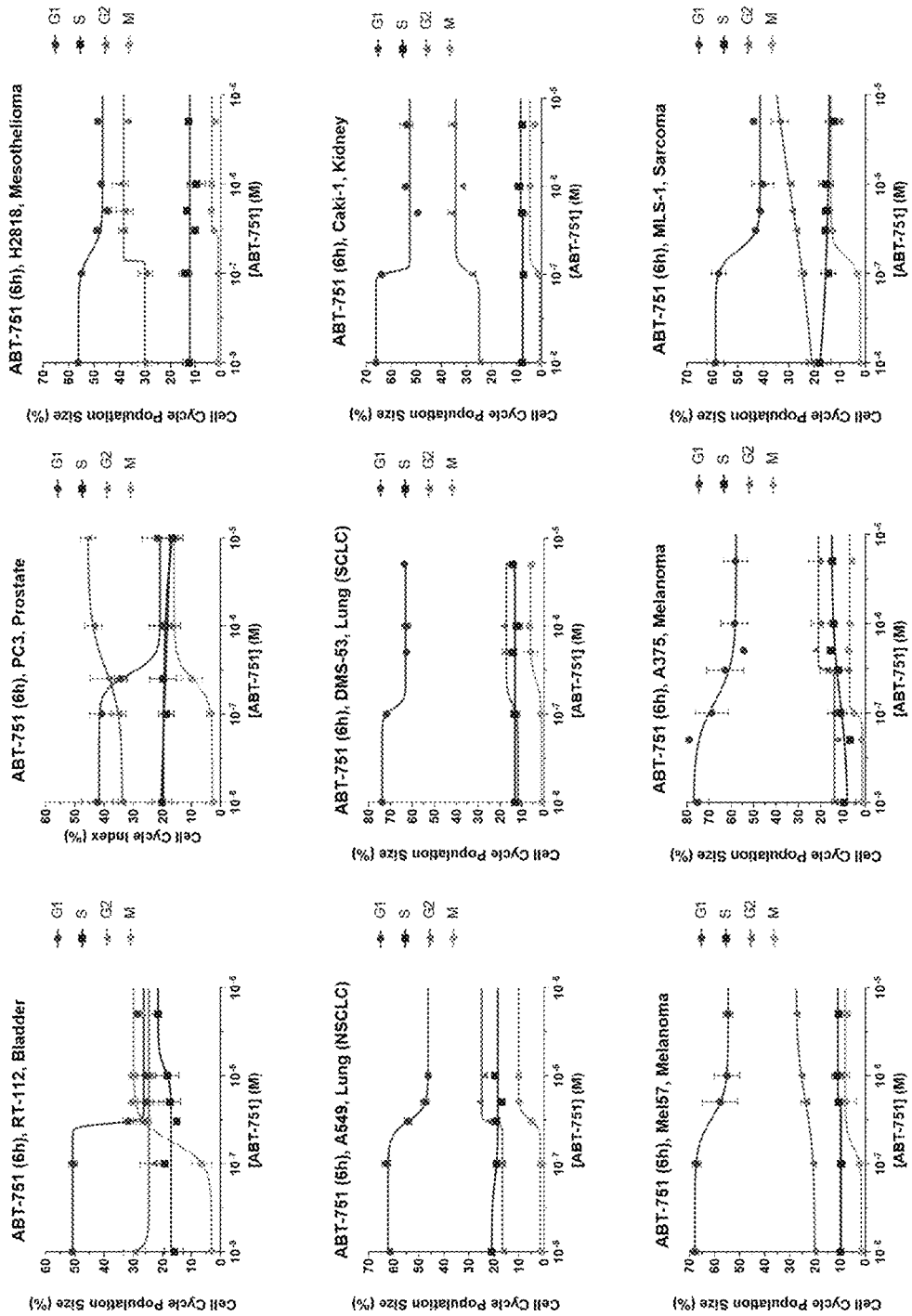

The section headings used herein are for organizational purposes only and are not to be construed as limiting the subject matter described.

A portion of this disclosure contains material that is subject to copyright protection (such as, but not limited to, diagrams, device photographs, or any other aspects of this submission for which copyright protection is or may be available in any jurisdiction.). The copyright owner has no objection to the facsimile reproduction by anyone of the patent document or patent disclosure, as it appears in the Patent Office patent file or records, but otherwise reserves all copyright rights whatsoever.

Various terms relating to the methods, compositions, uses and other aspects of the present invention are used throughout the specification and claims. Such terms are to be given their ordinary meaning in the art to which the invention pertains, unless otherwise indicated. Other specifically defined terms are to be construed in a manner consistent with the definition provided herein. Although any methods and materials similar or equivalent to those described herein can be used in the practice for testing of the present invention, the preferred materials and methods are described herein. For purposes of the present invention, the following terms are defined below.

As used herein, the singular forms "a," "an" and "the" include plural referents unless the context clearly dictates otherwise. For example, a method for administrating a pharmaceutical agent includes the administrating of a plurality of molecules (e.g. 10's, 100's, 1000's, 10's of thousands, 100's of thousands, millions, or more molecules).

As used herein the term "ABT-751" refers to the chemical agent N-[2-(4-hydroxyanilino)-3-pyridinyl]-4-methoxybenzenesulfonamide, also referred to as N-(2-((4-hydroxyphenyl)amino)pyrid-3-yl)-4-methoxybenzenesulfonamide and/or N-(2-((4-hydroxy-phenyl)amino)pyridin-3-yl)-4-methoxybenzenesulfonamide or any pharmaceutically acceptable salts, esters or ethers thereof. ABT-751 is described for the first time in U.S. Pat. No. 5,250,549, EP0472053 and equivalents. ABT-751 is a pharmaceutical agent, more specifically a chemotherapeutic agent. ABT-751 is classified as a tubulin inhibitor and/or an anti-mitotic agent. ABT-751 is also known under the synonyms E7010, E-7010 and E 7010.

The terms "about" and "approximately", when referring to a measurable value such as an amount, a temporal duration, and the like, is meant to encompass variations of ±20% or ±10%, more preferably ±5%, even more preferably ±1% and still more preferably ±0.1% from the specified value, as such variations are appropriate to perform the disclosed methods.

As used herein, the term "amount" is used interchangeably with the term "dose".

As used herein, the term "and/or" indicates that one or more of the stated cases may occur, alone or in combination with at least one of the stated cases, up to with all of the stated cases.

As used herein, the term "at least" a particular value means that particular value or more. For example, "at least 2" is understood to be the same as "2 or more" i.e., 2, 3, 4, 5, 6, 7, 8, 9, 10, 11, 12, 13, 14, 15, . . . , etc.

As used herein, the terms "cancer" and "tumor" (used interchangeably) refer to or describe the physiological condition in a host organism (e.g. a human) that is typically characterized by unregulated cell growth. The terms "cancer" and "tumor" also refer to cells that have undergone a cancerous/malignant transformation that makes them pathological to the host organism. Cancerous cells can be distinguished from non-cancerous cells by techniques known to the skilled person.

The term "chemotherapeutic treatment" or "chemotherapy" (often abbreviated as "chemo") as used herein refers to (the use of) a pharmaceutical agent or a combination of pharmaceutical agents in a cancer treatment, e.g. which can be part of a standardized chemotherapy regimen. Chemotherapy is given with a curative intent (which almost always involves combinations of chemotherapeutic agents), or it may aim to prolong life or to reduce symptoms (palliative chemotherapy).

The term "chemotherapeutic agent(s)" or "chemotherapeutic drug(s)" (also known as cytotoxic agents) as used herein refers to pharmaceutical agents capable of acting on or targeting rapidly dividing normal (non-cancer cells) and cancerous cells. Several types of chemotherapeutic agents exist, including alkylating agents (e.g. altretamine, busulfan, carboplatin, carmustine, chlorambucil, cisplatin, cyclophosphamide, dacarbazine, lomustine, melphalan, oxaliplatin, temozolomide, thiotepa, and others), antimetabolite agents (e.g. 5-fluorouracil (5-FU), 6-mercaptopurine (6-MP), capecitabine (Xeloda), cytarabine (Ara-C), floxuridine, fludarabine, gemcitabine (Gemzar), hydroxycarbamide and others), anti-microtubule agents (e.g. paclitaxel (Taxol), vinorelbine (Navelbine), docetaxel (Taxotere), vinblastine (Velban), and many others), topoisomerase inhibitors type I and II (type I: e.g. irinotecan, topotecan, camptothecin and lamellarin D, and others; and type II: e.g. etoposide (VP-16), teniposide, doxorubicin, daunorubicin, mitoxantrone, amsacrine, ellipticines, aurintricarboxylic acid, HU-331, and others), and cytotoxic antibiotic agents (e.g. dactinomycin, bleomycin, daunorubicin, and others), and many others.

As used herein the term "dose" refers to a specific individual amount of drug/medication, for example of a pharmaceutical agent, chemotherapeutic agent or ionizing radiation, taken at one time. Typically a dose is encompassed in, for example, one tablet, one capsule or one other vehicle for administration of medication to a subject.

As used herein the term "glioblastoma", refers to glioblastoma multiforme and/or all primary and secondary glioblastoma subtypes, wherein the glioblastoma is defined as being a tumor that has originated from glial cells which have undergone tumor transformation that makes them pathological to the host organism. A skilled person is accustomed with glioblastoma and knows how to distinguish the glioblastoma from other malignancies (Louis et al (2016) Acta Neuropathol. 31(6):803-20).

As used herein, the term "ionizing radiation" refers to a type of energy released by atoms in the form of electromagnetic waves or particles. As used herein the term "ionizing radiation"" refers to the ionizing radiation that occurs as electromagnetic rays, for example X-rays, gamma rays or particles, for example alpha and beta particles. Ionizing radiation as used herein can be provided to a subject by, for example, radiation therapy (RT), radiotherapy and the like. Ionizing radiation is well known in the art (Hellman, Essentials of Radiation Therapy, Cancer, Principles & Practice of Oncology, 248-275 (DeVita et al. ed., 10th Ed., V1, 2014)). Ionizing radiation may herein be abbreviated to "IR".

The term "metastasis" (plural: "metastases") or "cancer metastasis" (plural: "cancer metastases") as used herein refers to a situation where cancer cells break away from where they first formed (primary cancer), travel through the blood or lymph system, and form new tumors (metastatic tumors or lesions; also referred to as secondary tumors) in other (distal) parts of the body. The term is well-known in the art. The terms metastatic tumor and secondary tumor may be used interchangeable.

As used herein the term "mitotic enrichment" refers to a shift in the cell cycle of a cell induced by a pharmaceutical agent, in particular by ABT-751. The administration of ABT-751 to a subject and/or by adding ABT-751 in vitro to a cell culture can induce mitotic enrichment in said subject and/or cell culture. ABT-751 may for example synchronize the cell cycle of cells, preferably tumor cells, to the M-phase, for example by inducing an arrest of the normal cell cycle in M-phase by interfering with the colchicine site on β-tubulin.

As used herein, the term "pharmaceutically acceptable salts" refers to the relatively non-toxic, inorganic and organic acid or base addition salts of ABT-751 and/or the chemotherapeutic agents encompassed by the invention. Representative salts are known in the art (See, for example, Berge, et al. (1977) "Pharmaceutical Salts", J Pharm. Sci. 66: 1-19).

The term "primary brain tumor" as used herein refers to brain tumors (tumors that are localized in the brain) that find their origin in the brain, i.e. in brain tissue. The primary brain tumor, for example, can be from (neuro)epithelial tissues such as glioma from astrocytes and/or oligodendrocytes, meningioma from meningeal cells and medulloblastoma from primitive neuroepithelial cells.

The term "secondary brain tumor" as used herein refers to the tumors formed in the brain as a result of metastasis, for example as a result of a situation where cancer cells break away from where they first formed (primary cancer) in other (distal) parts of the body, travel through the blood or lymph system, and form new tumors (metastatic tumors or lesions) in the brain. Secondary brain tumors are tumors arising from cancer cells that have disseminated from another body part to the brain (but are now present in the brain), for example from the lung, breast, genitourinary tract, skin, colon and head and/or neck.

As used herein, the term "subject" refers to any vertebrate animal, but will typically pertain to a mammal, for example a human, a domesticated animal (such as dog or cat), a farm animal (such as horse, cow, or sheep) or a laboratory animal (such as rat, mouse, non-human primate or guinea pig). In preferred examples, the subject is human and includes males, females, adult, elderly, children or infants, suffering from or expected to be suffering from a brain tumor, regardless of the stage or state of the brain tumor.

As used herein, the term "Temozolomide", herein also abbreviated as TMZ, refers to the alkylating agent with IUPAC Name: 3-methyl-4-oxoimidazo[5,1-d][1,2,3,5]tetrazine-8-carboxamide, and any pharmaceutically acceptable salt, ester or ether thereof. TMZ was first described in U.S. Pat. No. 5,260,291. TMZ is well-known in the art.

As used herein, the term "therapeutically-effective amount" or "effective amount" refers to the amount of ABT-751, or any other chemotherapeutic agent as disclosed herein, which is effective for producing, e.g. an increase in the fraction of cells in a tumor that are in M-phase of the cell cycle e.g. during a period of at least 6 hours, and described herein, and therefor effective in producing an desired (therapeutic) effect in a subject at a reasonable benefit/risk ratio applicable and within the context of the treatment of the invention.

As used herein, the terms "treatment" and "treating" refer to therapeutic treatment. The object of the treatment is to at least slow down the disease condition. Those in need of the treatment include those already with the disease condition.

DETAILED DESCRIPTION

Present invention relates to providing ABT-751 for use in the treatment of a brain tumor in a subject, wherein the treatment comprises administering ABT-751 to said subject and delivering ionizing radiation to said subject. Present invention relates to the chemical agent ABT-751 as defined, i.e. including pharmaceutical acceptable salts, ester and ethers of ABT-751. ABT-751 is a sulfonamide antimitotic pharmaceutical agent developed by Eisai Co., Ltd. ABT-751 has been first described in U.S. Pat. No. 5,250,549, EP0472053 and equivalents.

Present invention relates to ABT-751, shown in formula (I) and/or to any pharmaceutically acceptable salts, esters or ethers thereof:

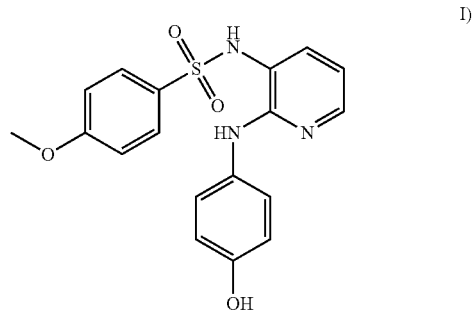 [SMILES: COc1ccc(S(=O)(=O)Nc2cccnc2Nc2ccc(O)cc2)cc1]

ABT-751 has been widely investigated to determine its mechanism of action, the pharmacokinetics of its formulations and the complementary enhancing effect of ABT-751 with chemotherapeutic agents, for example used in oncology. The currently known mechanism of action of ABT-751 is for example described in Lu et al. Pharm Res. 2012; 29(11): 2943-2971.

Due to its potential in oncology, ABT-751 has been widely clinically tested for use in the treatment of various cancers, for example in recurrent breast cancer, advanced lung cancer, non-small cell lung cancer, renal cell cancer and colorectal cancer. Other performed clinical trials comprise the use of ABT-751 in the treatment of metastatic prostate cancer, refractory hematologic malignancies, refractory solid tumors in young subjects, relapsed acute lymphoblastic leukemia, recurrent neuroblastoma and disseminated neuroblastoma. Importantly, the clinical development of ABT-751 has been discontinued.

The inventors have surprisingly found a novel therapeutic use for ABT-751. Based on the discovery that ABT-751 pertains plasma levels in humans (e.g. as reported in the art; see for example Hande et. Al (2006) Clin Cancer Res. 1; 12(9):2834-40) that in the models used, including brain tumor models, in the Examples are sufficient to achieve accumulation and synchronization of growing cancer cells (in the brain) in a specific phase of the cell cycle, the present invention provides a novel use of ABT-751 in combination with ionizing radiation, in the treatment of a brain tumor, i.e. in the treatment of a tumor in the brain.

The cell cycle consists of a series of growth- and development phases comprising the life cycle of a cell. The phases of a cell cycle are in brief: the G1-phase or first gap phase, the S-phase, wherein the cell synthesizes a copy of its DNA, the G2-phase or second gap phase, and the M-phase or mitosis. During mitosis cells undergo a duplication. The DNA comprised in the mother cells is replicated and cells are duplicated and divided into two daughter cells. Generally, one mother cell divides in two, preferably identical, daughter cells. In general, the cell cycle of one cell is not synchronized with the cell cycle of another cell. In other words, in for example a specific tissue the cells present are undergoing various phases of the cell cycle at a given moment. M-phase is the most sensitive cell cycle phase for ionizing radiation, as little to no DNA repair can occur during this phase. However, cells typically spend very little time in M-phase, leading to only a small population of cells being in this most vulnerable phase at any given time.

Present invention discloses ABT-751 for use in the treatment of a brain tumor, in other words a tumor that is localized in the brain. Specifically, the invention provides a treatment wherein ABT-751 exhibits an inhibiting effect on the progression of the cell cycle through M-phase and thus is herein provided to be incorporated in the treatment of a brain tumor as a radiotherapy sensitizing agent. In other words ABT-751 is provided herein as a chemotherapeutic agent that sensitizes dividing cells, preferably tumor cells, to ionizing radiation (IR).

It was found that accumulation and synchronization of cancer cells in M-phase by ABT-751 makes said cancer cells highly vulnerable to ionizing radiation. The combination of ABT-751 and ionizing radiation thus allows, by the combination, a new and improved treatment of a brain tumor. As herein provided, ionizing radiation is delivered to the subject and ABT-751 is administered to said subject. Ionizing radiation, for example delivered by radiation therapy, is considered part of the standard of care for the treatment of most cancers, including brain tumors. Ionizing radiation offers effective ways to treat certain kinds of cancer by delivering X-rays, gamma rays, and other forms of ionizing radiation to the tumor cells.

Commonly, the dose of ionizing radiation, for example used in radiation therapy is expressed in the unit "gray" (Gy). The skilled person knows that Gy stands for the absorption of one joule of radiation energy per kilogram of matter. For the treatment as provided herein ionizing radiation can be delivered by means of external radiation therapy, for example by external beam radiation therapy (EBRT), Intensity Modulated Radiation Therapy (IMRT), Image Guided Radiation Therapy (IGRT) and the like, or by means of internal RT, for example by brachytherapy. IR may be delivered in fractions, for example in at least 1 daily fraction, at least 2 daily fractions, at least 3, 4, 5, 6, 7, 8, 9, 10, 15, 20, 25, 30 or more fractions, to the subject. A typical used schedule is for example 2 Gy for 30 fractions, resulting in a (cumulative) dose of 60 Gy. IR may also be provided, for example, as a fraction once every other day, or once every two, three, or four days, and so on. The skilled person is aware that delivering ionizing radiation in multiple fractions per time period, for example per hour, per day or per week, relates to the term "hyperfractionation". Hyperfractionation is known to the person skilled in the art as the delivery of a high number of low-dose fractions of ionizing radiation over a period of time, cumulating over time to a high dose of ionizing radiation, for example of at least 50 Gy, 60 Gy, 70 Gy, 80 Gy, 90 Gy. Present invention does not relate to the method used for delivering IR. The method for delivering ionizing radiation may be determined by, for example, the attending physician.

In one embodiment of present invention ionizing radiation is delivered to the subject and ABT-751 is administered to a subject. In particular, it is preferred that the ionizing radiation is delivered to a subject after ABT-751 has been administered to a subject.

In one preferred embodiment the present invention provides ABT-751 for use in the treatment of a brain tumor, wherein administering ABT-751 to the subject is performed at least 4 hours, preferably at least 6 hours, before delivering ionizing radiation to the subject and/or preferably at most 48 hours before delivering ionizing radiation to the subject. It has been found that administering ABT-751 to the subject at least 1 hour, at least 2 hours, at least 4 hours, preferably at least 6 hours, for example 1 hour, 2 hours, 4 hours, 4.5 hours, 5, 5,5, 6, 6,5, 7, 7,5, 8, 9, 10, 12, 14, 16, 18, 20, 22, 24, 30, 32, 36, 40, 42, 44, 48 hours or more before delivering ionizing radiation to the subject and/or preferably at most 48 hours before delivering ionizing radiation to the subject results in an improved treatment of a brain tumor.

It is believed that by providing ABT-751 to the patient before providing ionizing radiation to the patient, for example within the given time ranges, allows ABT-751 to force a substantial fraction of tumor cells to accumulate in de radiosensitive M-phase to cause the tumor cells to become sensitized to the ionizing radiation. In other words, in this embodiment the invention there is provided for treatment of a brain tumor in a subject by treating the subject with ABT-751, followed by treatment with ionizing radiation. Treatment with ABT-751 prior to treatment with the ionizing radiation, as described above, was found to provide for an improved treatment of brain tumors.

In another embodiment there is provided for ABT-751 for use in the treatment according to the invention, wherein administering ABT-751 to the subject is performed 4-48 hours, preferably 4-24 hours, more preferably 6-18 hours, or even more preferably 6-8 hours before delivering ionizing radiation to the subject. Therefore, in this embodiment there is provided that administering ABT-751 to the subject is performed 0-48 hours, 2-48 hours, 4-48 hours, preferably 4-24 hours, 6-18 hours, or 6-8 hours before delivering ionizing radiation to the subject. As mentioned above, it is believed that administering ABT-751, prior to delivering ionizing radiation, induces accumulation in M-phase of the cell cycles of tumor cells. It is further believed that by providing ABT-751 within the described time ranges allows for delivering ionizing radiation to tumor cells when said tumor cells are (highly) vulnerable to said IR due to accumulation of cells in the M-phase by ABT-751.

In another embodiment there is provided for ABT-751 for use in the treatment according to the invention wherein administering ABT-751 to the subject is performed by administering ABT-751 in two or more separate doses, and wherein there is at least 0, 1, 2, 3, 4, 5, preferably 6 hours between the separate doses, preferably wherein there is 6-24 hours, more preferably 6-12 hours between the separate doses. According to the invention ABT-751 may be provided in one dose or in two or more separate doses, before the ionizing radiation to delivered to said subject. By providing two or more separate doses, preferably wherein there is 6-24 hours, more preferably 6-12 hours between the separate doses, the blood plasma level of ABT-751 can be sustained for a longer period at a level sufficient to cause mitotic enrichment prior to delivering the ionizing radiation to the subject.

In one preferred embodiment the invention provides ABT-751 for use in the treatment as disclosed herein, wherein administering ABT-751 to a subject is in an amount of 50 mg-400 mg, preferably 50 mg-100 mg and/or wherein delivering ionizing radiation to said subject is in an amount of 0.5 Gy-10 Gy, preferably 1 Gy-4 Gy, more preferably 1.5-2.8 Gy, and/or wherein administering ABT-751 to the subject is performed 4-24 hours, preferably 6-18 hours, more preferably 6-8 hours before delivering ionizing radiation to the subject. For example, in such embodiment, the subject is first provided with, for example, 100 mg ABT-751, and, for example, 7 hours after the patient was provided with 100 mg ABT-751, the patient is provided with, for example, 2.0 Gy ionizing radiation. After the subject has been treated with ionizing radiation, for example, 2, 4, 6, 10, 12, 16, 24, 48, or 72 hours after the subject has been treated with ionizing radiation, a next dose of ABT-751 (e.g. 100 mg) may be provided to the subject. In other words, between two treatments with ionizing radiation, the subject is treated with at least one dose ABT-751. The treatment (ABT-751 followed by ionizing radiation, as described herein), may, in preferred embodiments, be repeated, for example daily, for example every other day, or, for example for 4, 5 or 6 days in a week during a period of 4, 5, 6, 7 or more weeks. When reference is made to a dose of ABT-751, reference if made to ABT-751 as shown in formula (I).

As provided herein mg refers to milligrams of active pharmaceutical agent. The skilled person is able to calculate the exact amount of pharmaceutical active agent comprised in a pharmaceutical composition that can be administered to said subject as is provided herein. The amount of ABT-751, as disclosed herein, is a dose of ABT-751, as defined herein, that is administered to the subject having a brain tumor. A dose of ABT-751 comprises any suitable pharmaceutical composition of ABT-751 for administration to a subject. The amount to be administered to a subject should in the end be determined by the skilled person treating said subject.

In a further embodiment the present invention provides ABT-751 for use in the treatment as disclosed, wherein administering ABT-751 to the subject is performed by administering ABT-751 in two or more separate (sub)doses in an amount of 50 mg-400 mg, preferably 50 mg-100 mg; and/or delivering ionizing radiation to the subject is in an amount of 0.5 Gy-10 Gy, preferably 1 Gy-4 Gy, more preferably 1.5-2.8 Gy, wherein administering the final dose, for example the second dose, third, fourth, fifth, n$^{th}$ etc., of ABT-751 to the subject is performed 0-48 hours, 2-48 hours, 4-48 hours, preferably 4-24 hours, 6-18 hours, or 6-8 hours before delivering ionizing radiation to the subject.

With the term "final dose" is meant to indicate the dose of ABT-751 that is the last dose provided before the ionizing radiation is delivered to the subject. Indeed said administering of at least one dose of ABT-751 and delivering ionizing radiation to a subject is herein understood to be one so-called "treatment-cycle". Said treatment-cycle comprises the administration of at least one dose of ABT-751, for example administration of one dose of ABT-751, or administration of two doses of ABT-751, or administration of more doses of ABT-751, to a subject. Subsequently, following the administration of ABT-751, the treatment-cycle comprises delivering ionizing radiation to said subject. Ionizing radiation, as described before, is preferably delivered to a subject 0-48 hours, 2-48 hours, 4-48 hours, preferably 4-24 hours, 6-18 hours, or 6-8 hours after administering ABT-751 to said subject. In other words, a treatment-cycle as used herein should be understood as comprising step 1) administering ABT-751, and step 2) delivering ionizing radiation, wherein step 1) and 2) are separated by time as disclosed herein.

It is further disclosed herein that one treatment-cycle may be followed by another treatment-cycle.

In one embodiment present invention comprises ABT for use in the treatment as disclosed herein, wherein the treatment is performed (e.g. wherein the treatment-cycle is repeated), at least once per week, at least 2 times per week, preferably 5 times per week and/or wherein the total treatment (comprising of one or more treatment cycles as disclosed herein) is performed for a period of at least 1 week, preferably for at least 2 weeks, for 1-10 weeks, preferably for 1-6 weeks. For example the aforementioned treatment-cycle (ABT-751 followed by ionizing radiation) is repeated at least 2 times per week, preferably 5 times per week. Further, the aforementioned treatment-cycle may be repeated for at least 1 week, preferably for at least 2 weeks, for 1-10 weeks, preferably for 1-6 weeks, for example 1-2 weeks. A period of treatment thus comprises a series of treatment-cycles spread out over a period of time, for example of one week up to 10 weeks. The skilled person is aware that standard of care reveals that a period of the treatment for brain tumors is preferably 6 weeks. A skilled person is also aware that the period of the treatment is dependent on various factors, for example the age, weight, life style, severity of disease condition, activity level and the like of the subject. As such, a skilled person is able to determine per subject the duration of a period of treatment.

According to another embodiment, there is provided for ABT-751 in the treatment according to the invention, wherein between one or more subsequent treatments comprising administering ABT-751 to the subject and delivering ionizing radiation to the subject there is a period of non-treatment preferably wherein the non-treatment period is for 1-30 days, preferably 1-14 days, 1-7 days or 1-3 days. The time between one treatment-cycle (ABT-751 followed by ionizing radiation) and a subsequent treatment-cycle is not in particular limited, and treatment may be continuous, but is in a preferred embodiment the time of non-treatment is between 1-30 days, preferably 1-14 days, 1-7 days or 1-3 days For example, in a non-limiting example, the subject may be treated with ABT-751 (i.e. a treatment cycle) 5 times per week, during a period of 4 weeks. After the 5 days, treatment with ABT-751, followed by ionizing radiation, may be continued or may be halted, for example, for one day. After the period of 4 weeks the physician be, for example, decided to halt treatment with ABT-751 and ionizing radiation, for a short period, for example for 5 or 7 days, before continuing the treatment.

A period of non-treatment as disclosed herein is a period wherein the subject is not subjected to ABT-751 and/or ionizing radiation, and preferably also not to other chemotherapy. A period of non-treatment directly follows a period of treatment and precedes another period of treatment. A period of non-treatment is commonly referred to as a "drug holiday", "medication vacation" or "drug vacation". Said period is a strategic interruption of the treatment of a brain cancer. It is believed that a period of non-treatment allows recovery of the body of the subject. Said recovery enables a subsequent period of treatment of said subject. The skilled person is able to determine the length of the period of non-treatment based on the duration of the period of treatment preceding the period of non-treatment. The skilled person further may take into account the subject's age, weight, life style, severity of disease condition, activity level and the like in determining the duration of the period of non-treatment.

In one embodiment the present invention provides ABT-751 for use in the treatment as disclosed herein, wherein ABT-751 is administered per enteral administration, for example oral administration, or parenteral administration, for example intravenous (into a vein) administration. Preferably ABT-751 is administered per oral administration.

It is further contemplated that the pharmaceutical preparation comprising the therapeutically-effective amount of active ingredient is administered with or without an excipient, wherein excipients comprise, for example, accelerators, anti-adherents, binders, coatings, colors, diluents, disintegrates, emulsifiers, flavors, humectants, glidants, lubricants, preservatives, sorbents, sterilizing agents, sweeteners, solubilizers, vehicles, mixtures thereof and the like. Administration by the oral route of administration is preferred by subjects due to the low to absent invasiveness of the therapy compared to for example intravenous administration.

In another embodiment the present invention provides ABT-751 for use in the treatment as disclosed herein, wherein the blood plasma level of ABT-751 in a subject is at least 2 µM, preferably at least 2 µM for 0-48 hours, 2-48 hours, 4-48 hours, preferably for 4-24 hours, for 6-18 hours, or for 6-8 hours before delivering ionizing radiation to the subject.

ABT-751 is preferably used in the form of a pharmaceutical composition containing the relevant therapeutically-effective amount of active ingredient. It is contemplated that a therapeutically-effective amount of ABT-751 in the present invention depends on the recipient of the treatment, the brain cancer being treated and the severity of the brain cancer. Further it is contemplated that said therapeutically-effective amount of ABT-751 may depend on compositions containing the therapeutically-effective amounts, the route of administration, the duration of the treatment, the potency of therapeutically-effective amounts, the rate of clearance and/or whether ABT-751 is co-administered with another pharmaceutical agent, for example an antibody or a chemotherapeutic drug.

Exposure of a pharmaceutical agent to the body may depend on the route of administration. The attending physician should take into account the route of administration for determining the therapeutically effective amount of ABT-751 administered to the subject. Preferably, the attending physician further takes into account the pharmacokinetic properties of ABT-751 in terms of blood plasma level, drug distribution, metabolism, active metabolites, clearance rate for selecting the specific amount of ABT-751. Preferably, the blood plasma level should be at least 2 µM for a period of at least 0 hours to 48 hours, 2 hours to 48 hours, 4 hours to 48 hours, 4 hours to 24 hours, 6 hours to 18 hours, or 6 hours to 8 hours. It is contemplated that ABT-751 after at least 0 hours to 48 hours, 2 hours to 48 hours, 4 hours to 48 hours, 4 hours to 24 hours, 6 hours to 18 hours, or 6 hours to 8 hours results in arresting the cell cycle in M-phase. As disclosed herein, ionizing radiation is delivered 0-48 hours, 2-48 hours, 4-48 hours, preferably 4-24 hours, 6-18 hours, or 6-8 hours after administering of ABT-751. Blood plasma levels are inherently correlated to the effect of the treatment disclosed in the invention.

In one embodiment the present invention provides ABT-751 for use in the treatment as disclosed herein, wherein the treatment of a brain tumor further comprises administering a further pharmaceutical agent to the subject, preferably wherein the pharmaceutical agent is an antibody and/or an alkylating agent. In a preferred embodiment the present invention provides ABT-751 for use in the treatment as disclosed herein, wherein said antibody is a monoclonal antibody, for example bevacizumab, that is further administered to the subject. Bevacizumab, known under tradename Avastin®, is a widely used monoclonal antibody that binds to circulating VEGF-A and inhibits its biological activity by preventing the interaction with the VEGF receptor. For some brain tumors such antiangiogenic therapies are effective (additional) treatment options. In another preferred embodiment the present invention provides ABT-751 for use in the treatment as disclosed herein, wherein said alkylating agent is temozolomide. Temozolomide is a chemotherapeutic agent specifically indicated as a first-line of the treatment and/or second-line of the treatment for brain tumors. The mechanism by which temozolomide acts as a chemotherapeutic agent/alkylating agent is by alkylating/methylating DNA, thereby triggering cell death in tumors.

The response to temozolomide in glioblastoma can be predicted by (the degree of) methylation of 06-methylguanine-DNA methyltransferase (MGMT) promoter, because the primary mechanism of resistance of tumors to treatment with temozolomide is dependent on the activity of the promoter of MGMT in said tumors. Consequently, the standard of care of said tumors revealing inactivated, (hyper) methylated, promoter of MGMT may include treatment with temozolomide. On the other hand, brain tumor cells comprising activated, unmethylated, promoter of MGMT may not respond to treatment with temozolomide.

By providing the aforementioned therapeutic use for ABT-751 the present invention offers new treatment options and, potentially, less-burdensome treatment regimens for subjects suffering from a brain tumor.

A further embodiment of the invention provides ABT-751 for use in the treatment as disclosed herein, wherein the brain tumor is a primary brain tumor or a secondary brain tumor (metastatic brain tumor). As will be understood by the skilled person, the tumor in the brain may be benign, but is preferably a malignant tumor. Preferably the tumor in the brain that is to be treated in a primary brain tumor. The primary brain tumor that is treated by administering ABT-751 and delivering ionizing radiation can be any primary tumor occurring in the brain. Such primary brain tumors are for example astrocytomas, meningiomas, oligodendrogliomas, medulloblastomas, ependymomas, craniopharyngiomas, gliomas, central nervous system lymphomas, chordomas, pineoblastomas and schwannomas. Primary brain tumors occur by abnormal growth of cells in the brain. Abnormal growth of cells can, for example, be induced by mutations or deletions of tumor suppressor genes, inherited genes or IR.

In a preferred embodiment of the invention the primary brain tumor of which the subject is suffering is an astrocytoma. In a more preferred embodiment the astrocytoma is a glioblastoma, even more preferably the glioblastoma is selected from the group consisting of primary glioblastoma, recurrent glioblastoma, glioblastoma with hypermethylation of the promoter of the gene 06-Methylguanin-Methyltransferase (MGMT), glioblastoma without hypermethylation of the promoter of MGMT.

In another embodiment the invention provides ABT-751 for use in the treatment of a secondary brain tumor, wherein the secondary brain tumor is treated by administering ABT-751 and delivering ionizing radiation to a subject. Secondary brain tumors are tumors that have spread from a different area in the subject's body to the brain, in other words tumors that have formed in the brain as a result of metastasis. In one embodiment the secondary (i.e. metastatic) tumor is a tumor selected from the group consisting of pulmonary tumor, breast tumor, genitourinary tract tumor, bone tumor, skin tumor, head tumor, neck tumor, meroblastic tumor, gastrointestinal tumor, colorectal tumor, pancreatic tumor, hematopoietic tumor and lymphoid tissue tumor. In a preferred embodiment of present invention the secondary brain tumor is a pulmonary tumor, breast tumor or skin tumor.

In a preferred embodiment of the present invention the tumor (primary or secondary) in the brain and that is to be treated does not comprise a KRAS-mutation, more preferably the primary brain tumor does not comprise a KRAS-mutation, i.e. is not a KRAS-mutated tumor.

As taught herein the subject is a mammal, including humans. Said mammal is suffering from a cancer, specifically from a brain tumor. Preferably wherein the subject is a human, the subject is a human with a brain tumor.

In a preferred embodiment of the present invention said subject is a young adult, an adolescent, a juvenile and/or a child. In a more preferred embodiment of the present invention the subject is 18 years old or younger, most preferably the subject is less than 10 years old, for example the subject has the age of 9, 8, 7, 6, 5, and so on.

In one aspect the present invention provides ionizing radiation for use in the treatment of a brain tumor in a subject, wherein the treatment comprises administering ABT-751 to said subject and delivering ionizing radiation to said subject. It will be understood that all preferences, embodiments, and details discussed herein above also apply to this aspect of the invention.

In another aspect the present invention provides combination therapy for use in the treatment of a brain tumor in a subject, wherein the treatment comprises administering ABT-751 to said subject and delivering ionizing radiation to said subject. It will be understood that all preferences, embodiments, and details discussed herein above also apply to this aspect of the invention.

In a further aspect the invention provides a method for the treatment of a brain tumor in a subject, wherein the method comprises administering to said subject an effective amount of ABT-751 and delivering an effective amount of ionizing radiation to said subject. It will be understood that all preferences, embodiments, and details discussed herein above also apply to this aspect of the invention.

It will be appreciated by persons skilled in the art that numerous variations and/or modifications may be made to the above-described aspects and/or embodiments, without departing from the broad general scope of the present invention. The present aspects and/or embodiments are, therefore, to be considered in all respects as illustrative and not restrictive. The present invention includes the following non-limiting examples./pct

EXAMPLES

Methods and Results

We first studied whether ABT-751 increases the mitotic population of cancer cell lines (FIG. 1). Several lines of various origins—brain, colorectal, prostate, head & neck and cervical cancer—were exposed to a dose range of ABT-751 and incubated for 6 hours, after which the cell cycle was analyzed by flow cytometry.

Flow cytometric cell cycle analysis using propidium iodide (PI; DNA staining) and phospho-histone H3 staining (pHH3; mitotic marker) demonstrates effective induction of mitotic enrichment in cancer cell lines of various adult and pediatric origins, both from primary brain tumors and tumors that metastasize to the brain. ABT-751 dose-dependently increases the percentage of mitotic cells (DNA 4N, pHH3+) at the expense of G1 cells (DNA 2N, pHH3−). S phase cells (DNA 2N-4N, pHH3−) stay unaffected, while the amount of G2 cells (DNA 4N, pHH3−) appears to increase slightly.

This analysis confirmed that ABT-751 dose-dependently increases the mitotic population of cancer cell lines at the expense of the relatively radio-resistant G1 population. In all cell lines tested, maximum achievable mitotic enrichment within 6 hours was achieved at 1 μM ABT-751. This shift in cell cycle distribution will hereafter be referred to as induction of mitotic enrichment.

Figure 2:
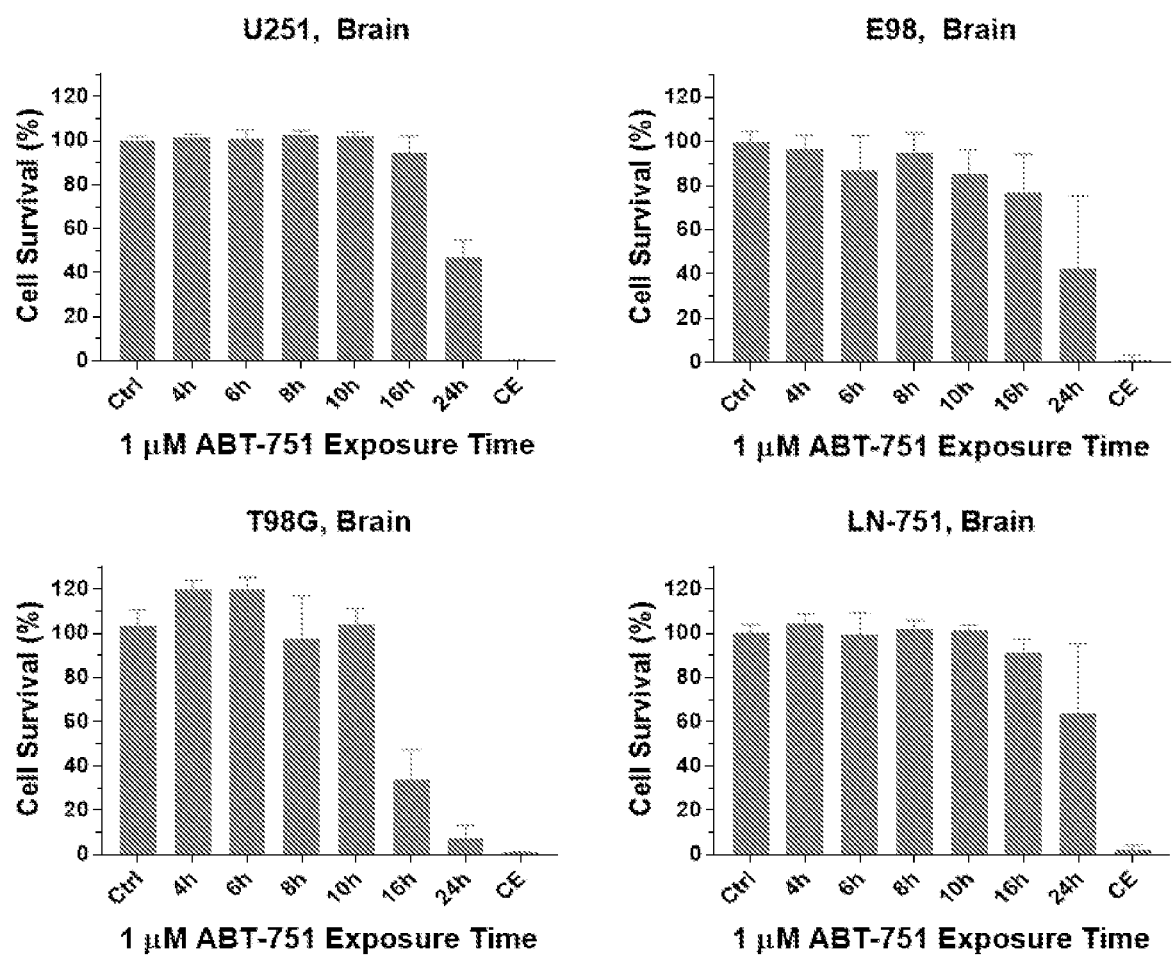
FIG. 2: ABT-751 can induce temporary mitotic enrichment up to at least 10 hours without causing cytotoxicity.

Importantly, induction of mitotic enrichment could be achieved without inducing cytotoxicity. No loss of viability was observed up to 10 hours of exposure in a cell survival assay in which various cancer cell lines were exposed to a concentration of ABT-751 (1 μM) that efficiently induces mitotic enrichment (FIG. 2).

Figure 3:
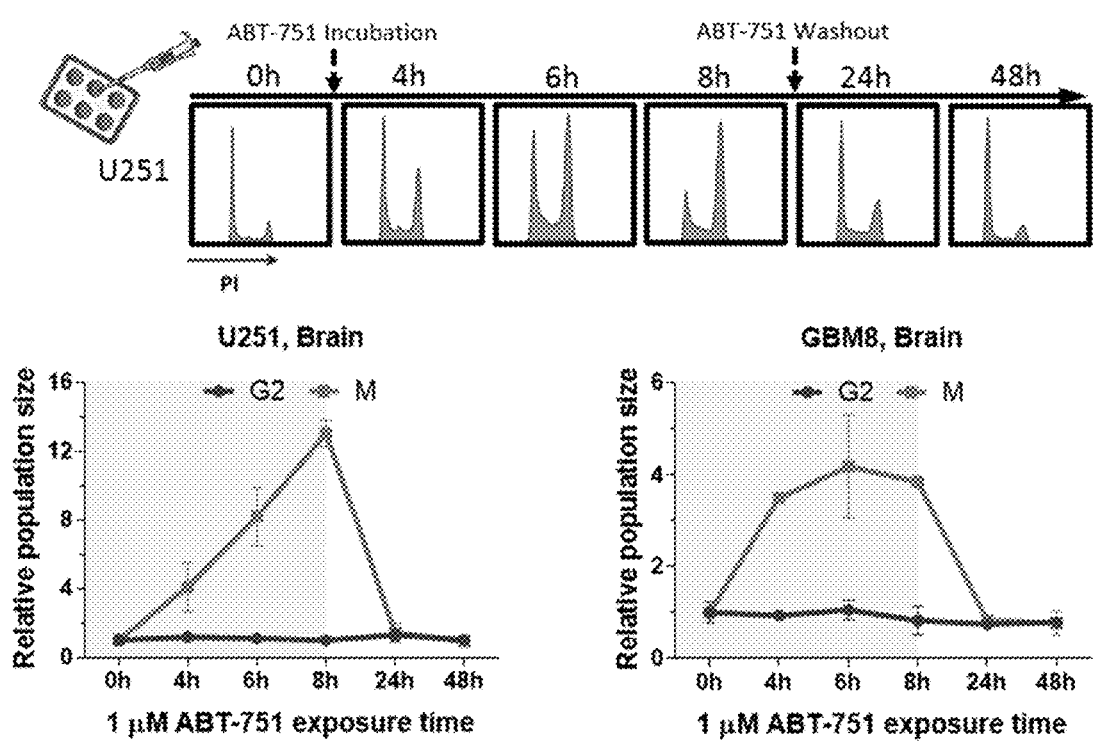
FIG. 3: Induction of mitotic enrichment by ABT-751 is reversible and does not have a long-term impact on the cell cycle.

To demonstrate that the effects of ABT-751 on the cell cycle distribution are reversible, two independent brain cancer cell lines were exposed to 1 μM ABT-751 for up to 8 hours, after which ABT-751 was washed away and cells were followed up until 48 hours after initial exposure to the drug. Flow cytometric analysis as described above at various time points confirmed that ABT-751 induces a time-dependent increase of the mitotic population that reverts back to pre-exposure levels after the drug is removed. Importantly, the G2 phase of the cell cycle is unaffected. Together, these data demonstrate that induction of mitotic enrichment by ABT-751 is non-cytotoxic for up to 10 hours because the effect on the cell cycle is reversible (FIG. 3).

Figure 4:
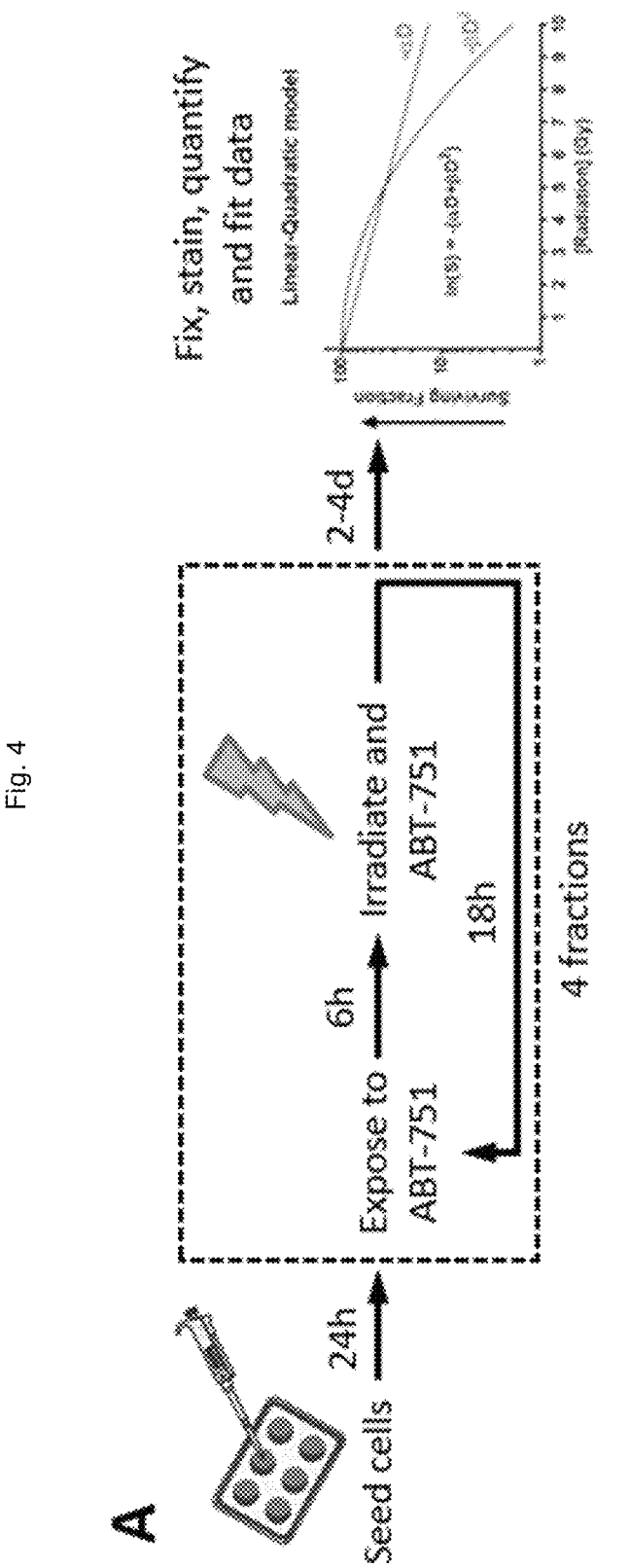
FIG. 4: A: Experimental procedure for determining radio sensitization of ABT-751 in cancer cell lines. B: Administration of ABT-751 prior to delivering ionizing radiation radio sensitizes cancer cell lines.
Figure 4:
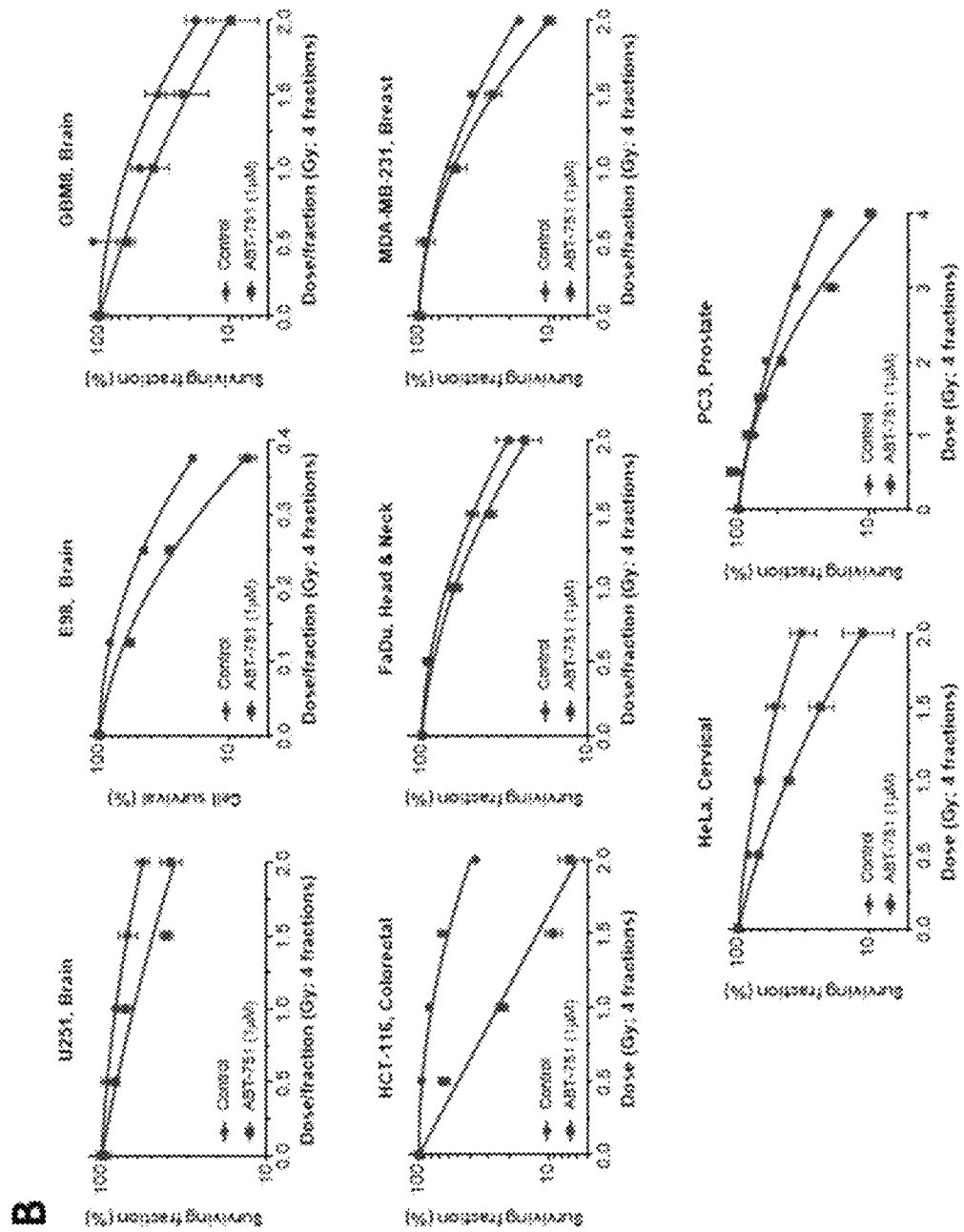

Using clonogenic assays, we confirmed that induction of mitotic enrichment by ABT-751 radiosensitizes tumor cells from various origins. To achieve induction of mitotic enrichment, we exposed cells to 1 μM of ABT-751 for 6 hours, at which time we exposed cells to a dose range of ionizing radiation (FIG. 4A). Directly after irradiation, we washed ABT-751 away and waited for 18 hours before the process was repeated. In total, the process of induction of mitotic enrichment and subsequent irradiation was repeated 4 times to resemble a clinical hyperfractionation schedule. After the last fraction, cells were left to grow out into viable colonies and clonogenic potential was quantified. The results of these assay clearly demonstrate that induction of mitotic enrichment using ABT-751 radiosensitizes cancer cells of various origins (FIG. 4B).

Figure 5:
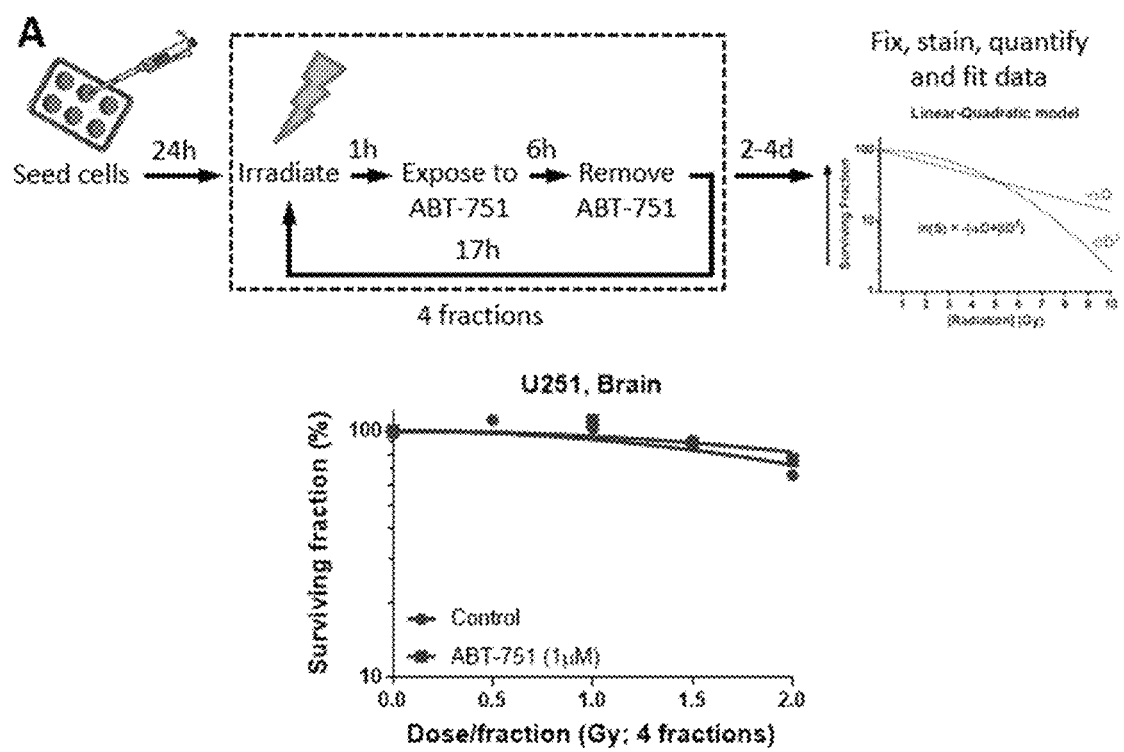
FIG. 5: A: Delivering ionizing radiation prior to administering ABT-751 does not result in radio sensitizing effects of ABT-751. B: Delivering ionizing radiation after 1 h of exposure to ABT-751 does not result in radio sensitizing effects of ABT-751. C: Irradiation prior to administration of ABT-751 does not result in induction of mitotic enrichment by ABT-751.
Figure 5:
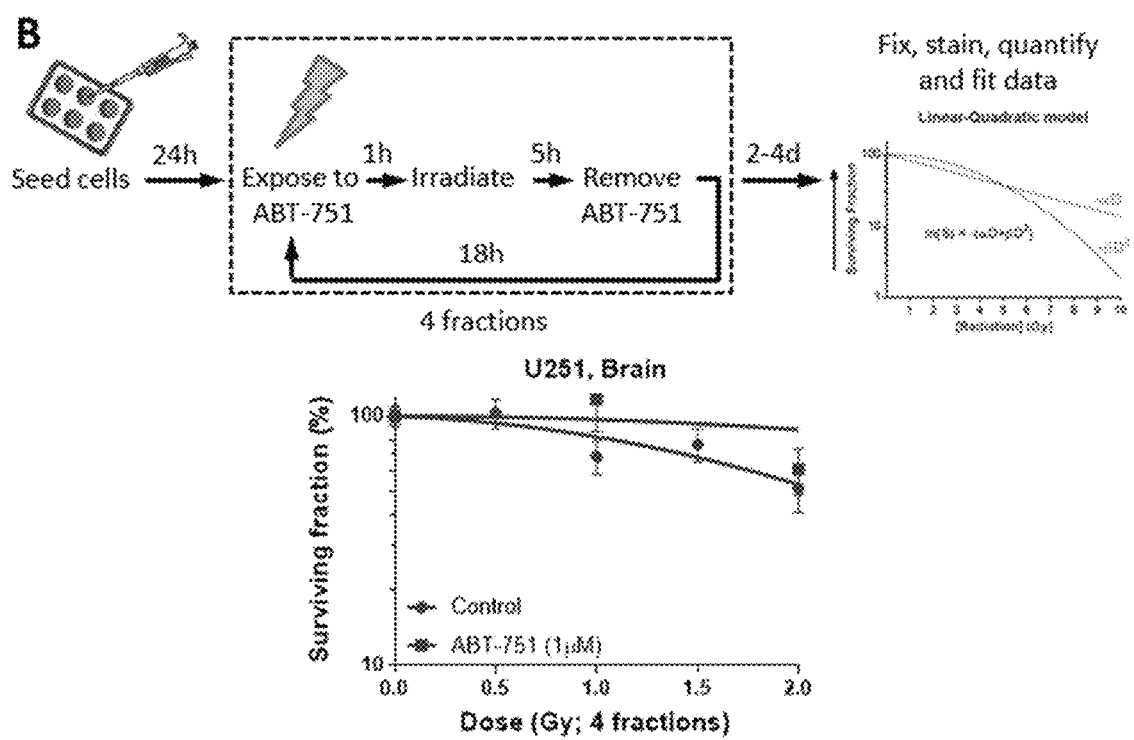
Figure 5:
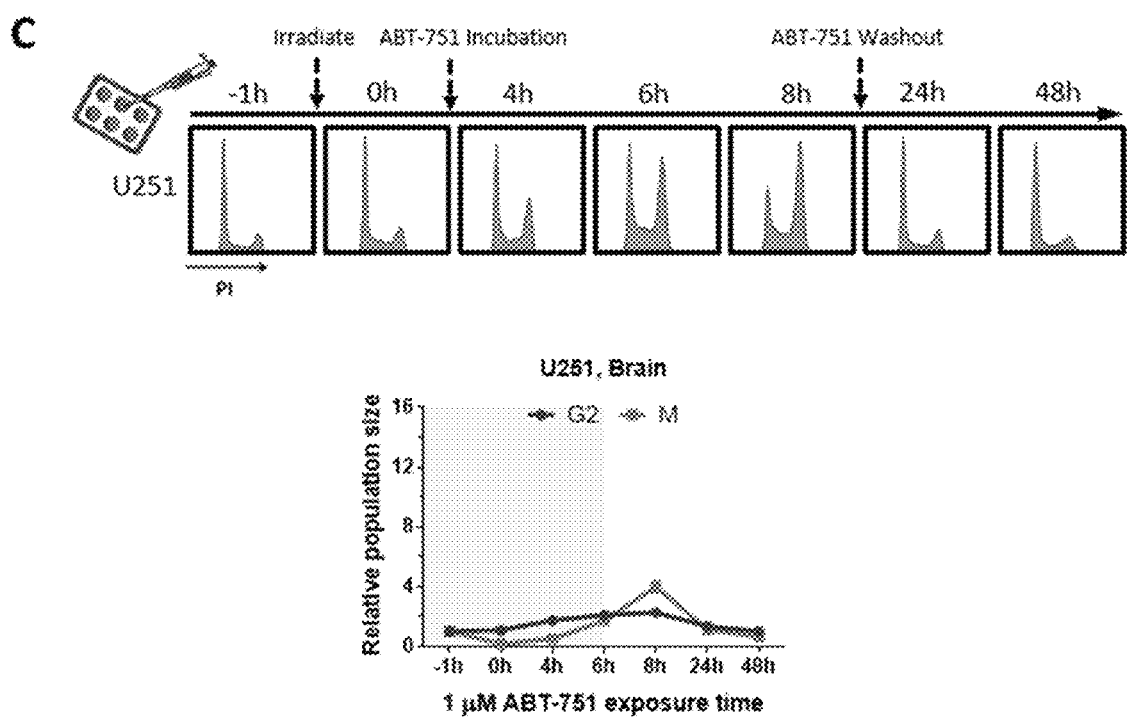

To demonstrate that induction of mitotic enrichment is required for the radiosensitizing effect of ABT-751, we used to approaches that encompassed the same exposure to ABT-751 and ionizing radiation, albeit using different timing that does not allow induction of mitotic enrichment. In the first set-up, we irradiated cells prior to exposure to ABT-751 (FIG. 5A). In the second approach, we irradiated cells prematurely after only 1 hour of exposure to ABT-751 while maintaining the total exposure time of ABT-751 at 6 hours (FIG. 5B). In neither of the sequences radiosensitizing effects of ABT-751 were observed, demonstrating that the timing of these sequences is vital in order to allow for induction of mitotic enrichment by ABT-751. Indeed, flow cytometric analysis confirmed that ABT-751 could not induce mitotic enrichment when cells were irradiated prior to exposure (FIG. 5C).

Figure 6:
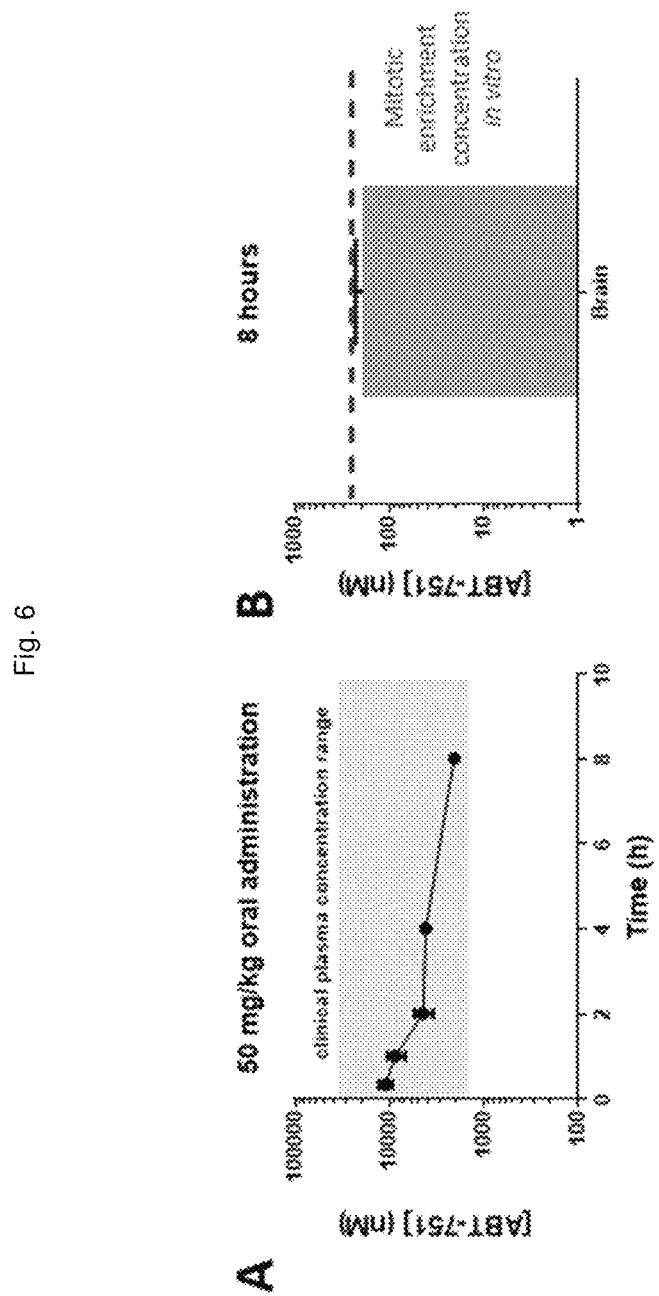
FIG. 6: A: Oral administration of 50 mg/kg to mice yields plasma kinetics that are clinically relevant. B: Concentrations in the brains of the mice supersede the concentration required to achieve mitotic enrichment in vitro for up to 8 hours.

In order to facilitate the in vivo translation of the radiosensitization approach, we first established the dose level that achieved clinically relevant plasma concentrations in mice. Using a validate LC-MS/MS method, we measured the plasma concentration—time curve in mice following oral administration of 50 mg/kg ABT-751 in formulation containing DMSO:Cremophor EL:$H_2O$ (1:1:8). Indeed, murine plasma concentration were in the range of those achieved in patients at a clinically safe dose levels for up to 8 hours (FIG. 6A). Importantly, the ABT-751 concentration in the brain 8 hours after administration (FIG. 6B) was still in the range of the concentration that is sufficient to induce mitotic enrichment in vitro (FIG. 1).

Figure 7:
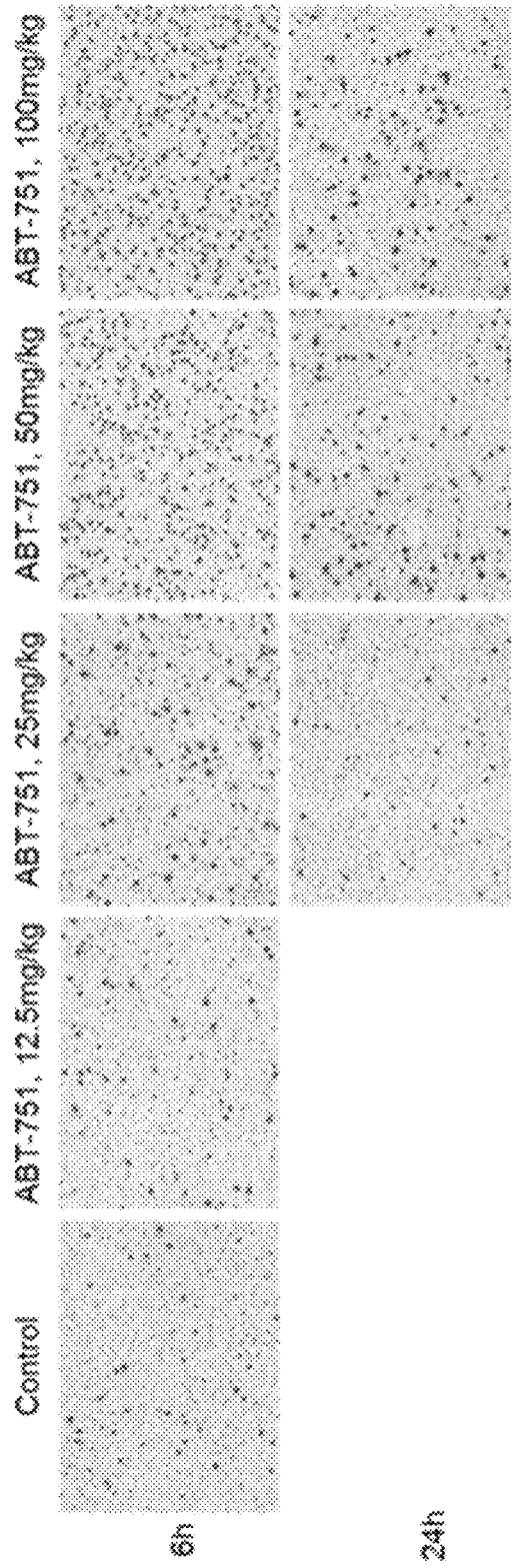
FIG. 7: Dose dependent mitotic enrichment by ABT-751 in an orthotopic murine glioma model.
Figure 7:
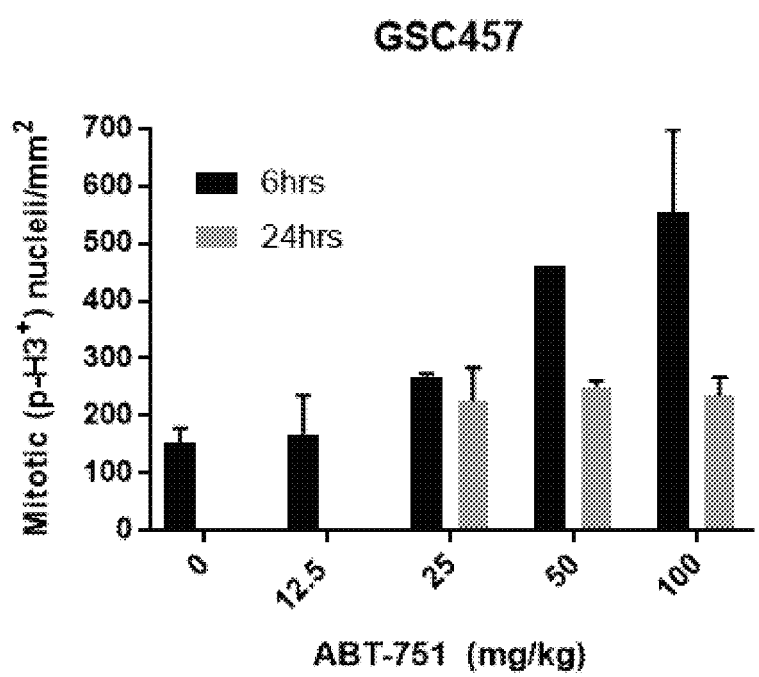

To study the pharmacokinetic-pharmacodynamic relationship of ABT-751 in vivo, we made use of a genetically engineered mouse model-derived brain cancer model that was previously established in our lab. We implanted these GSC457 brain cancer cells in the brains of recipient mice and followed up their growth using bioluminescence imaging. When full-blown tumors had established, we treated tumor-bearing mice with different doses of ABT-751 and collected their brains 6 hours or 24 hours after administration. Subsequent immunohistochemical staining of p-H3 revealed that ABT-751 dose-dependently induced mitotic enrichment in brain tumors in vivo, with the most clear increases being achieved at doses of 50 mg/kg or higher (FIG. 7). Importantly, at all doses the mitotic population has reverted to baseline levels 24 hours after administration of ABT-751, demonstrating the reversibility of induction of mitotic enrichment by ABT-751 in vivo.

Figure 8:
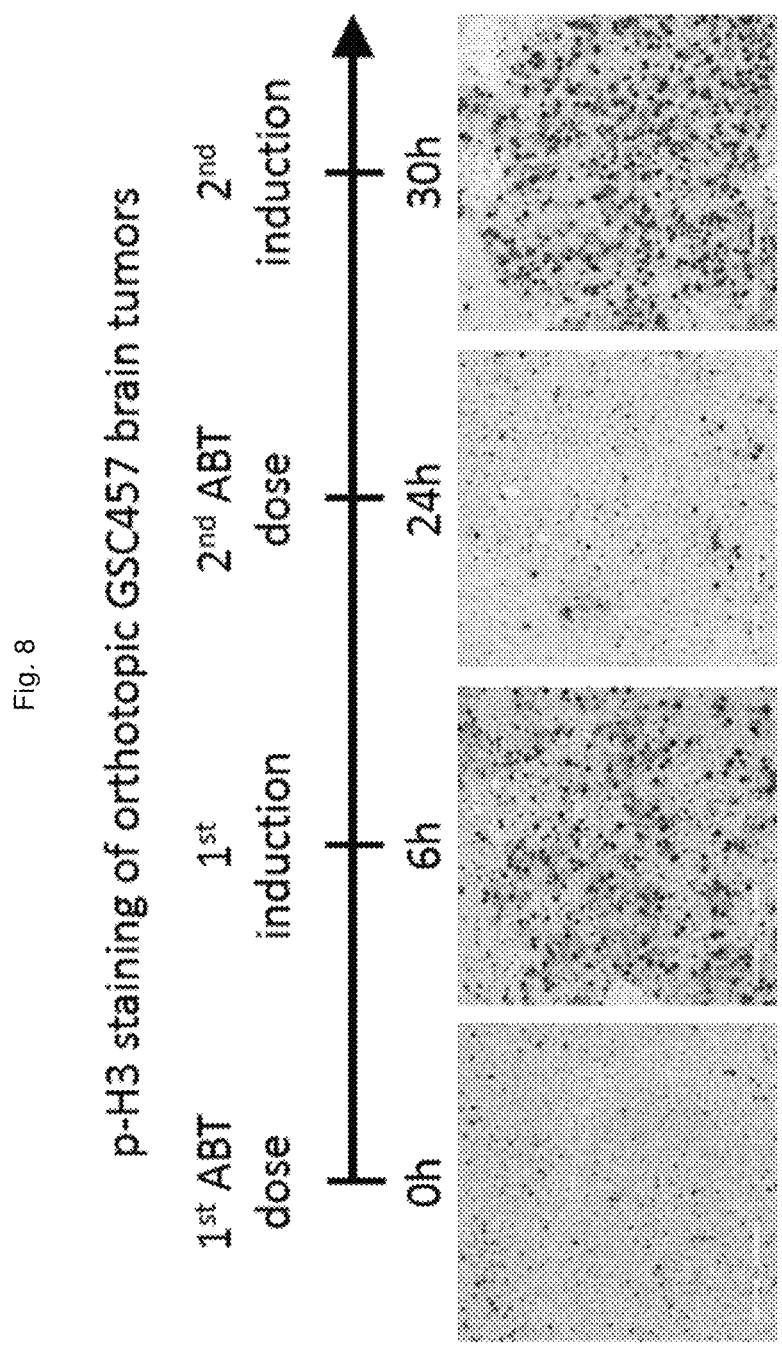
FIG. 8: Repeated mitotic enrichment of brain tumors by administrating multiple doses of ABT-751 is feasible and equally efficient as single mitotic enrichment by administrating a single dose of ABT-751.
Figure 8:
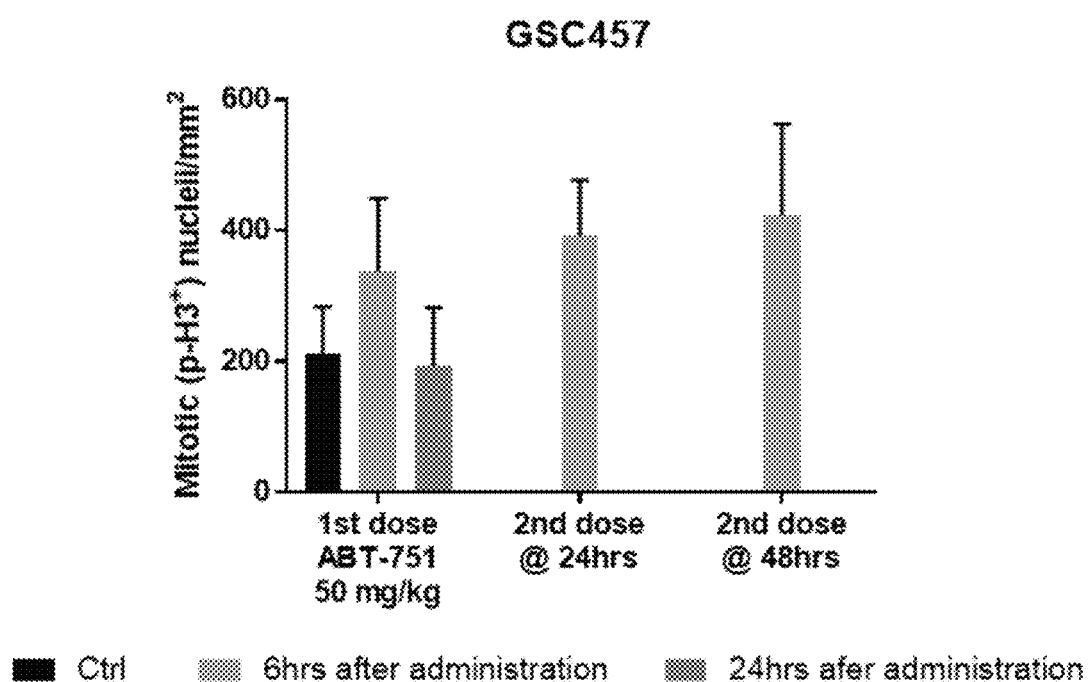

We next aimed to confirm whether repeated induction of mitotic enrichment was feasible and efficient in vivo. Using the same murine brain cancer model as described above, we quantified the number of mitotic cells in tumors 6 hours after administration of one dose of 50 mg/kg of ABT-751 and compared the levels to those in tumors 6 hours after receiving a second administration of 50 mg/kg of ABT-751 either 24 or 48 hours after the first administration. We again confirmed that mitotic enrichment can efficiently be induced by ABT-751 in brain cancer in vivo (FIG. 8).

Moreover, we demonstrated that repeated induction of mitotic enrichment by ABT-751 is feasible without loss of efficiency when a waiting period of 24 hours or longer is observed between subsequent doses.

Figure 9:
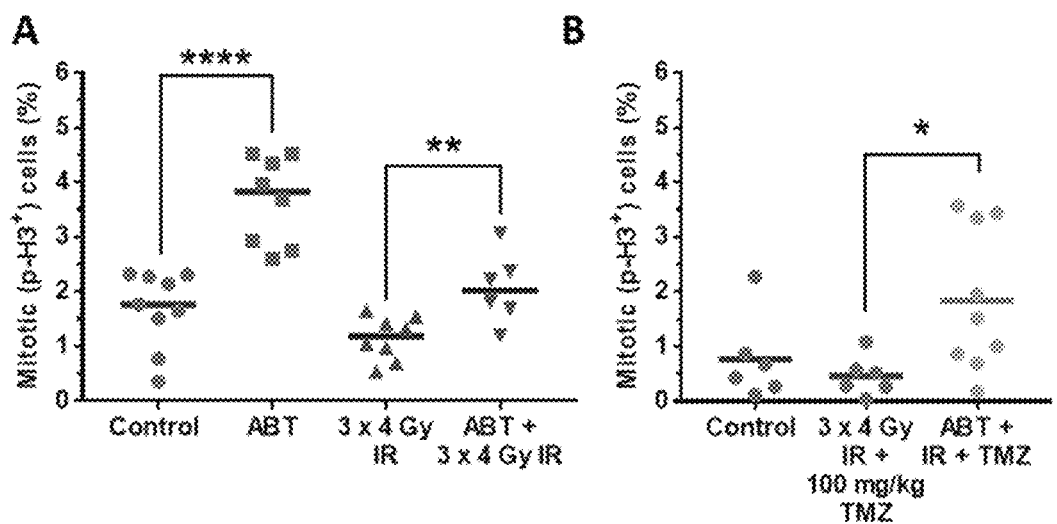
FIG. 9: A: Mitotic enrichment of brain tumors by administrating ABT-751 is compatible with ionizing radiation (IR) B: Mitotic enrichment of brain tumors enrichment by administrating ABT-751 is compatible with ionizing radiation (IR) and temozolomide (TMZ) chemotherapy.

In the clinic, the standard-of-care for glioblastoma—the most common and aggressive adult brain cancer—involves ionizing radiation and concomitant alkylating chemotherapy using temozolomide. Therefore, we next confirmed that induction of mitotic enrichment in vivo using ABT-751 is compatible with chemo-radiotherapy. Again using the same murine brain cancer model, we could show that ABT-751 can induce mitotic enrichment when given concomitantly with either radiotherapy alone (FIG. 9A) or chemo-radiotherapy involving temozolomide (FIG. 9B).

Figure 10:
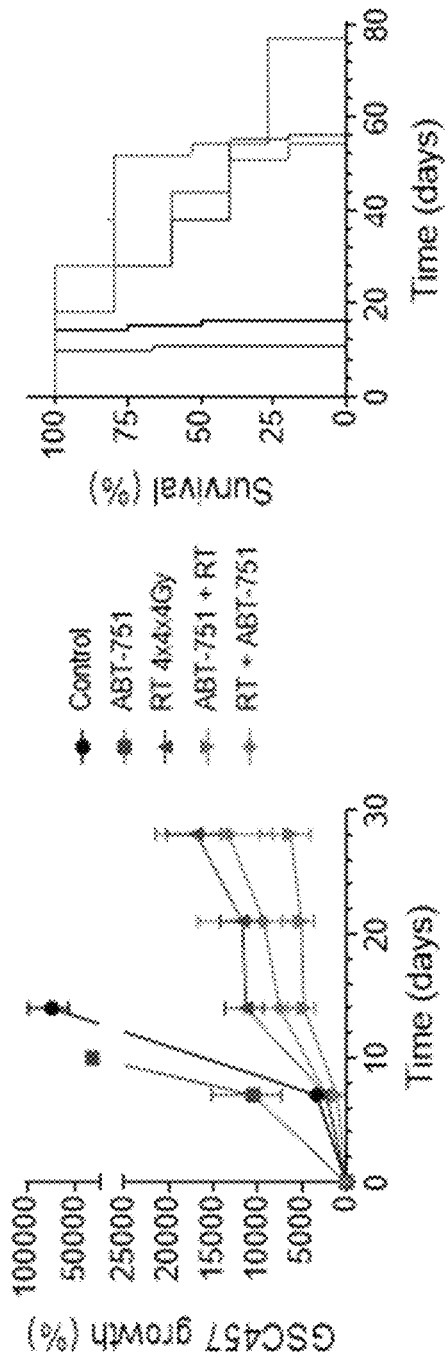
FIG. 10: A: Mitotic enrichment by administrating ABT-751 radio sensitizes orthotopic brain tumors in mice and extends survival of said mice. B: Mitotic enrichment by ABT-751 in orthotopic brain tumors in mice extends survival of said mice.
Figure 10:
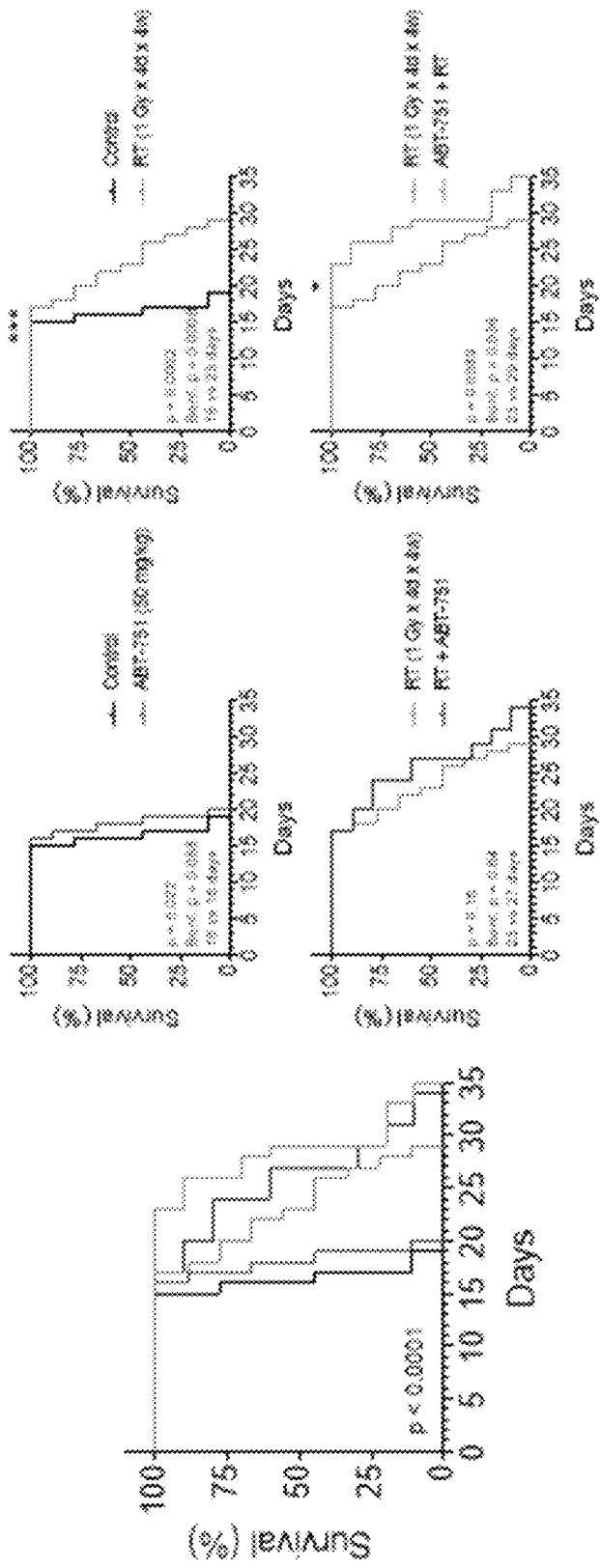

Further, we aimed to demonstrate that induction of mitotic enrichment by ABT-751 radiosensitizes brain cancer in vivo using three independent brain cancer models (GSC457, U87 and GBM8). The first model is described above and was also used to study the pharmacokinetic-pharmacokinetic relationship in FIGS. 7-9. Mice bearing these GSC457 tumors were stratified between 5 treatment arms:
1. Control treatment,
2. 50 mg/kg daily ABT-751 for 4 days/week for 4 consecutive weeks
3. 4 Gy of ionizing radiotherapy (RT) for 4 days/week for 4 consecutive weeks
4. ABT-751 given 6 hours prior to RT for 4 days/week for 4 consecutive weeks
5. RT administered prior to ABT-751 for 4 days/week for 4 consecutive weeks The growth of these tumors could be followed up using bioluminescence imaging. In this model, RT had a modest effect on tumor growth and mouse survival, that could be enhanced by given ABT-751 6 hours prior to every fraction of radiotherapy (FIG. 10A). Importantly, a similar radiosensitizing effect could not be observed in the arm receiving RT prior to ABT-751, validating that the sequence and timing of administration is also very important for radiosensitization in vivo as it is in vitro (see FIG. 5).

The second brain cancer model in which we validated these results is a human brain cancer cell line that we also implanted in the brains of recipient mice. This U87 model is more intrinsically radiosensitive and was therefore irradiated with fractions of 1 Gy instead of 4 Gy as used above. This second model confirmed our previous findings and even demonstrated a more striking effect size, as administration of ABT-751 6 hours prior to RT doubled the survival benefit that was achieved by RT alone (FIG. 10B). Again, importantly, administering ABT-751 after RT was applied did not achieve a survival benefit.

Figure 11:
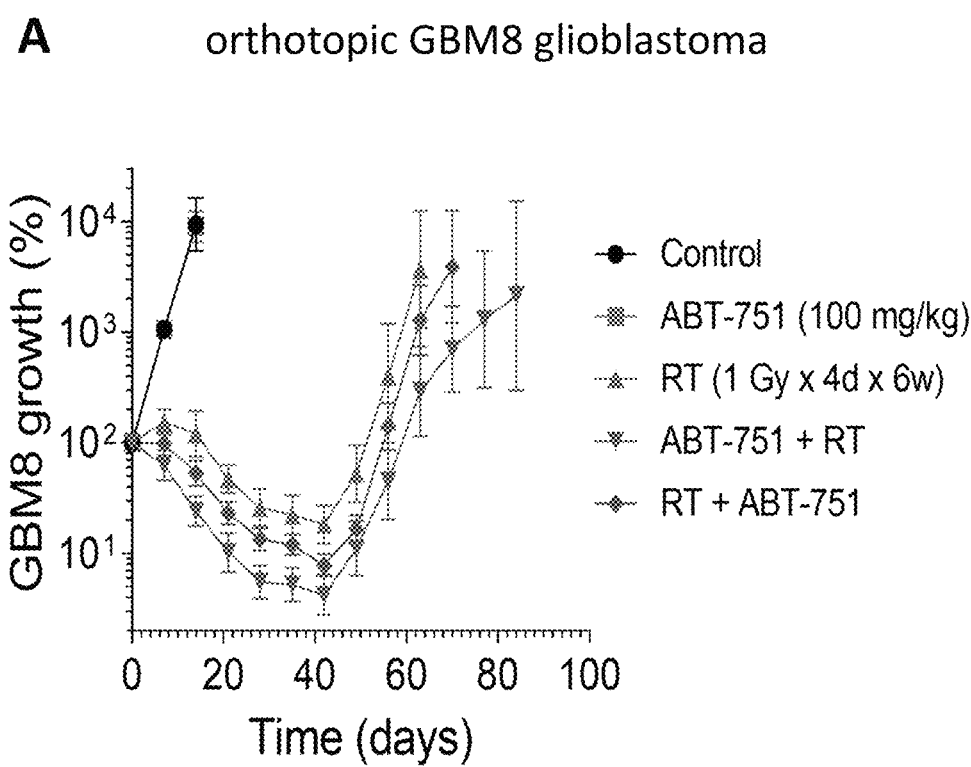
FIG. 11: A: Mitotic enrichment by ABT-751 radiosensitizes orthotopic brain tumors in mice and reduces growth. B: Mitotic enrichment by ABT-751 in orthotopic brain tumors in mice extends survival.
Figure 11:
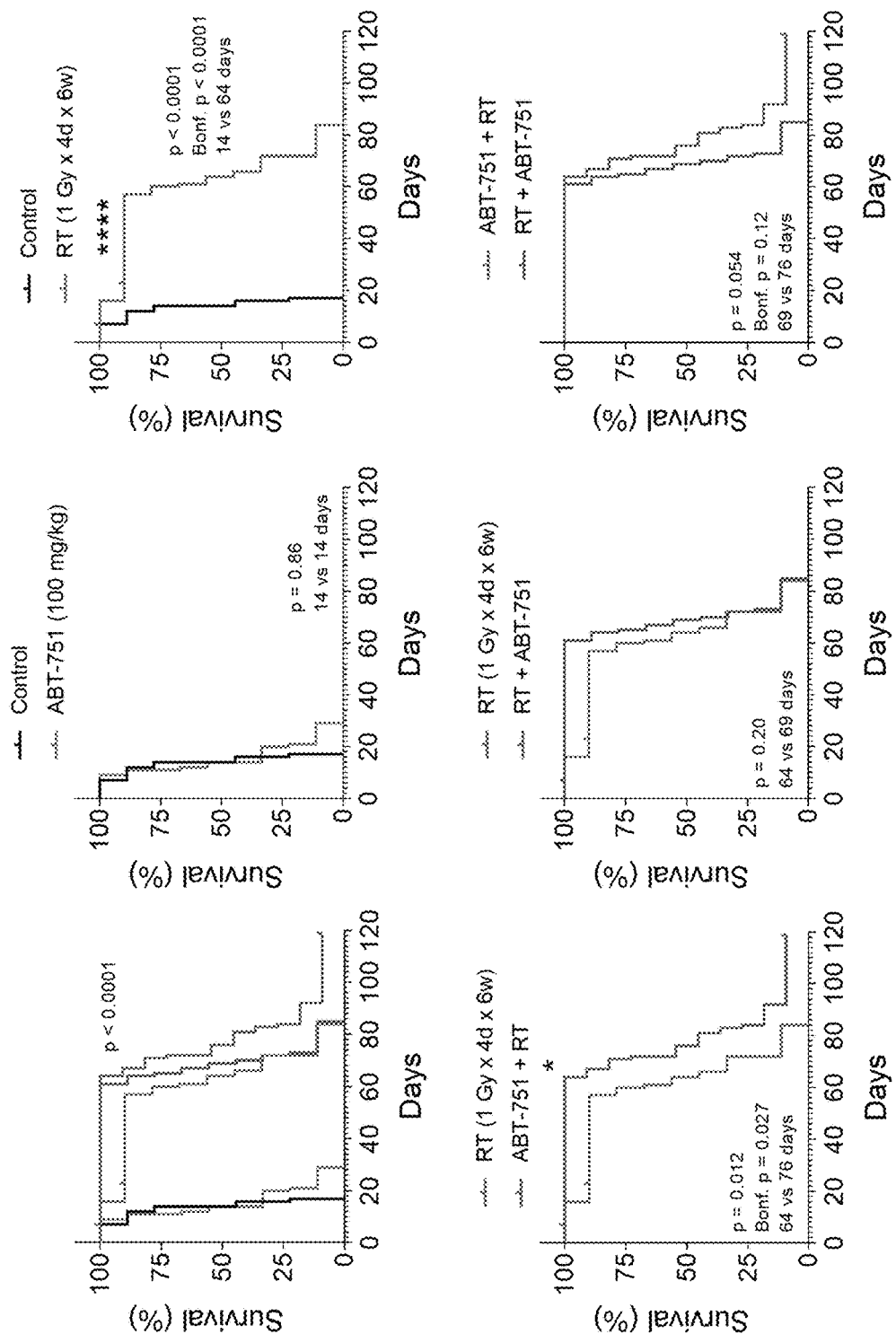

The third brain cancer model in which we aimed to demonstrate that induction of mitotic enrichment by ABT-751 radiosensitizes brain cancer in vivo is the orthotopic glioma stem cell-like (GSC) model GBM8. Mice bearing these GBM8 tumors were stratified between 5 treatment arms:
1. Control treatment,
2. 100 mg/kg daily ABT-751 for 4 days/week for 6 consecutive weeks
3. 4 1 Gy of ionizing radiotherapy (RT) for 4 days/week for 6 consecutive weeks
4. ABT-751 given 6 hours prior to RT for 4 days/week for 6 consecutive weeks
5. RT administered prior to ABT-751 for 4 days/week for 6 consecutive weeks The growth of these tumors could be followed up using bioluminescence imaging. In this model, RT reduced tumor growth and increased mouse survival, which could be significantly enhanced by giving ABT-751 6 hours prior to every fraction of radiotherapy (FIG. 11). ABT-751 treatment alone did not affect tumor growth (FIG. 11A) or survival (FIG. 11B), while radiotherapy slowed down tumor growth and extended survival. Importantly, adding ABT-751 to radiotherapy further slowed down tumor growth and extended survival, but only when 6 hours prior to radiotherapy according to the mitotic enrichment setup. Increased efficacy could not be observed when ABT-751 was administered after radiotherapy and mitotic enrichment could not be induced, demonstrating that ABT-751 radiosensitizes glioblastoma in vivo via induction of mitotic enrichment. Importantly, a similar radiosensitizing effect could not be observed in the arm receiving RT prior to ABT-751, validating that the sequence and timing of administration is vital for radiosensitization in vivo.

Finally, to investigate whether the mitotic enrichment strategy using ABT-751 induced toxicity in healthy tissues we studied several parameters.

Figure 12:
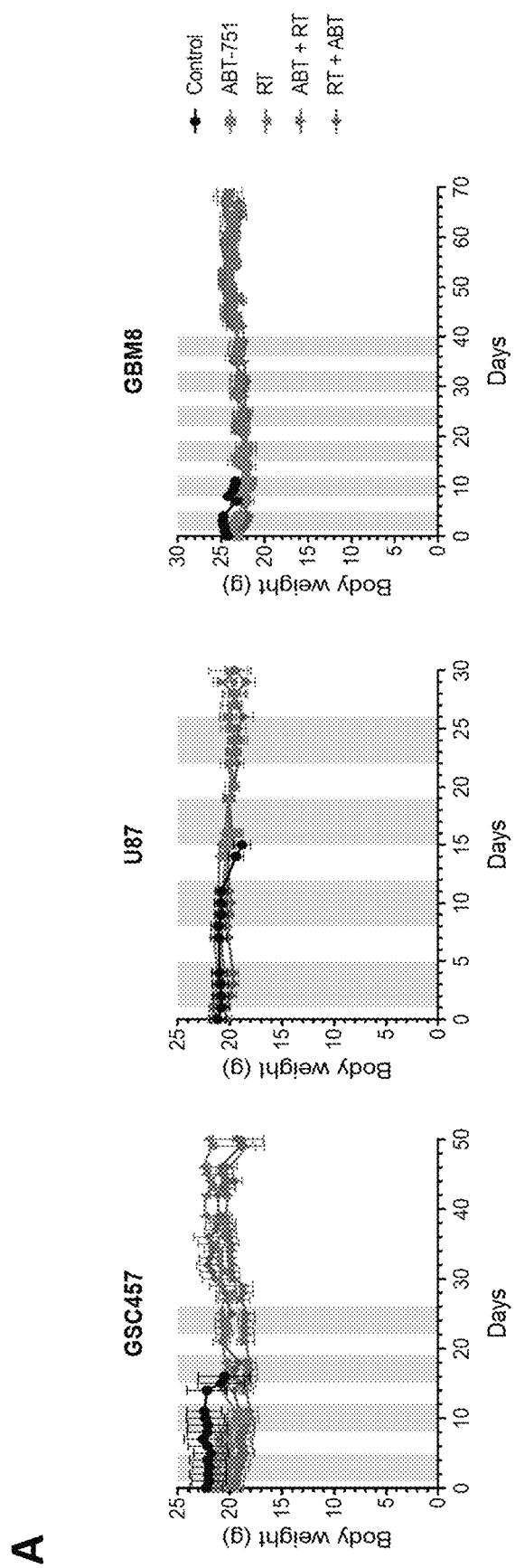
FIG. 12: A: Mitotic enrichment by ABT-751 does not affect animal weights throughout three efficacy studies in mice bearing orthotopic GSC457, U87 and GBM8 tumors. B: Quantification of DNA damage markers on orthotopic GSC457 tumors. C: Representative images of immunohistochemistry for DNA damage markers on orthotopic GSC457 tumors.
Figure 12:
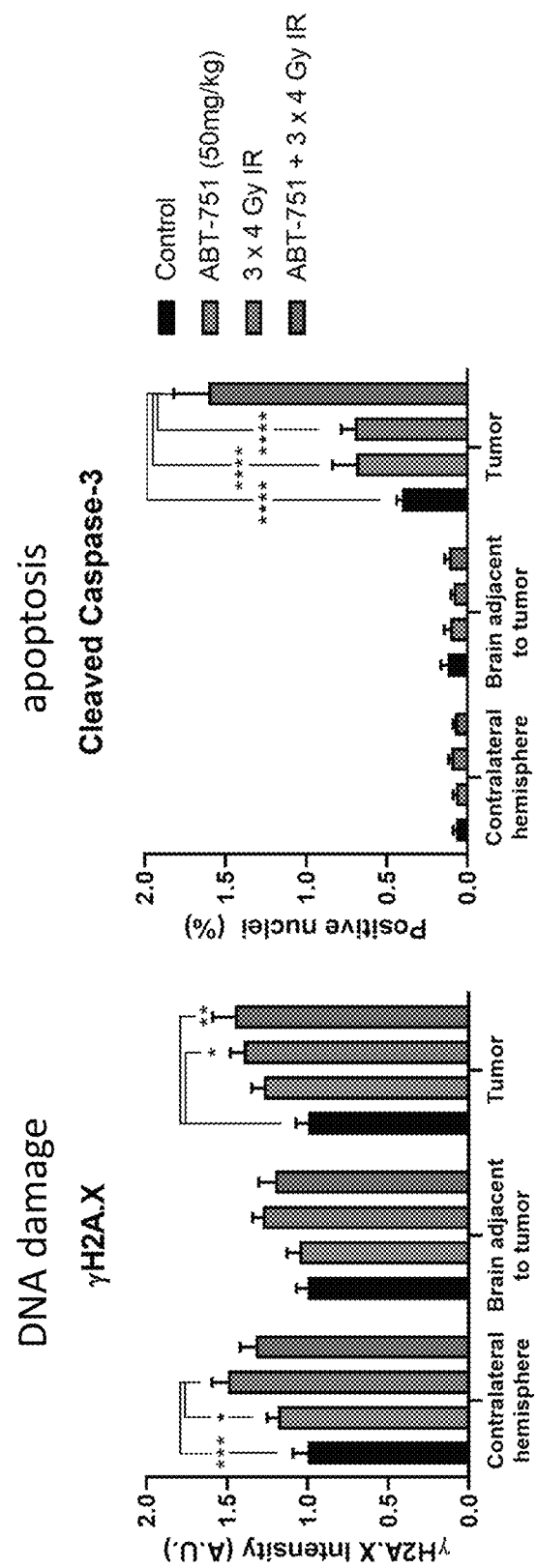
Figure 12:
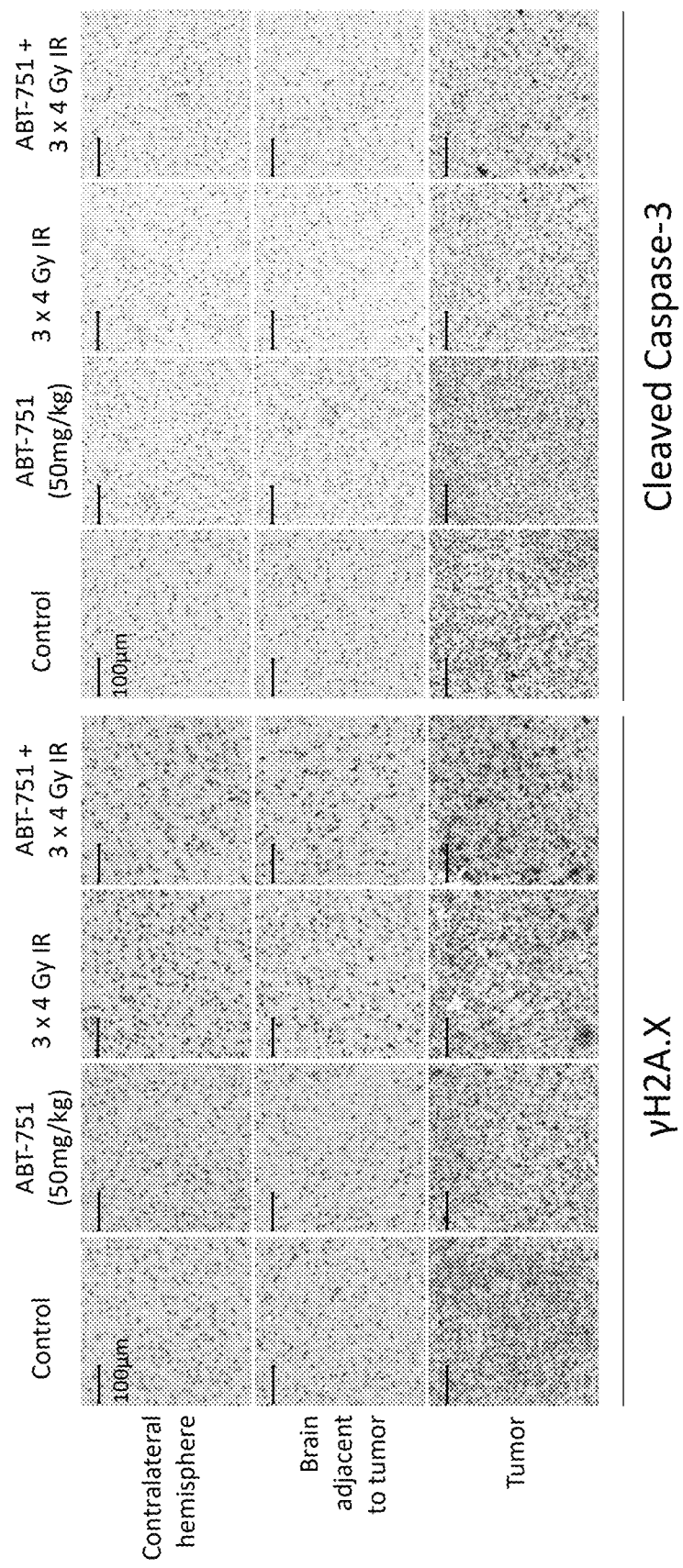

First, no treatment-related weight loss of mice bearing orthotopic GSC457, U87 or GBM8 tumors was observed (FIG. 12A). Second, immunohistochemistry staining of on-treatment samples from mice bearing orthotopic GSC457 tumors demonstrated that mitotic enrichment by ABT-751 prior to radiotherapy did not increase DNA damage (yH2A.X) or apoptosis (cleaved-Caspase 3) in healthy surrounding brain tissue. However, it did strongly increase apoptosis specifically in the tumor compared to radiotherapy alone (FIG. 12B,C).

Taken together, the set of experiments described above demonstrated that ABT-751 can efficiently, reversibly and non-cytotoxically induce mitotic enrichment in cancer cells from various origins; that this mitotic enrichment achieves effective radiosensitization; that the dose, timing and sequence of administration is very important for achieving mitotic enrichment and radiosensitization; that induction of mitotic enrichment by ABT-751 is compatible with hyperfractionated radiotherapy and chemo-radiotherapy; and that radiosensitization of brain tumors can be achieved in vivo at a dose level of ABT-751 that yields clinically safe and achievable plasma concentrations. ConclusionTaken together, the set of experiments described above demonstrated that ABT-751 can efficiently, reversibly and non-cytotoxically induce mitotic enrichment in cancer cells in the brain; that this mitotic enrichment achieves effective radiosensitization; that the dose, timing and sequence of administration is crucial for achieving mitotic enrichment and radiosensitization; that induction of mitotic enrichment by ABT-751 is compatible with hyperfractionated radiotherapy and chemo-radiotherapy; and that radiosensitization of brain tumors can be achieved in vivo at a dose level of ABT-751 that yields clinically safe and achievable plasma concentrations.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

All references cited herein, including journal articles or abstracts, published or corresponding patent applications, patents, or any other references, are entirely incorporated by reference herein, including all data, tables, figures, and text presented in the cited references. Additionally, the entire contents of the references cited within the references cited herein are also entirely incorporated by references.

Reference to known method steps, conventional methods steps, known methods or conventional methods is not in any way an admission that any aspect, description or embodiment of the present invention is disclosed, taught or suggested in the relevant art.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

It will be understood that all details, embodiments and preferences discussed with respect to one aspect of embodiment of the invention is likewise applicable to any other aspect or embodiment of the invention and that there is therefore not need to detail all such details, embodiments and preferences for all aspect separately.

Having now generally described the invention, the same will be more readily understood through reference to the following examples which is provided by way of illustration and is not intended to be limiting of the present invention. Further aspects and embodiments will be apparent to those skilled in the art.

What is claimed is:

1. A method for treating a brain tumor in a subject, wherein the treatment comprises administering ABT-751 to said subject and delivering ionizing radiation to said subject.

2. The method of claim 1, wherein administering ABT-751 to the subject is performed at least 4 hours before delivering ionizing radiation to the subject.

3. The method of claim 1, wherein administering ABT-751 to the subject is performed 4-48 hours before delivering ionizing radiation to the subject.

4. The method of claim 1, wherein administering ABT-751 to the subject is performed by administering ABT-751 in two or more separate doses, and wherein there is at least 6 hours between the separate doses.

5. The method of claim 1, wherein
administering ABT-751 to the subject is in an amount of 50 mg-400 mg, and/or
delivering ionizing radiation to the subject is in an amount of 0.5 Gy-10 Gy;
and wherein administering ABT-751 to the subject is performed 4-48 hours, before delivering ionizing radiation to the subject.

6. The method of claim 1, wherein
administering ABT-751 to the subject is performed by administering ABT-751 in two or more separate doses in an amount of 50 mg-400 mg,
delivering ionizing radiation to the subject is in an amount of 0.5 Gy-10 Gy;
and wherein administering the final dose of ABT-751 to the subject is performed 4-48 hours before delivering ionizing radiation to the subject.

7. The method of claim 1, wherein the treatment is performed at least 2 times per week.

8. The method of claim 1, wherein between one or more subsequent treatments comprising administering ABT-751 to the subject and delivering ionizing radiation to the subject there is a period of non-treatment preferably wherein the non-treatment.

9. The method of claim 1, wherein ABT-751 is administered orally.

10. The method of claim 1, wherein the blood plasma level of ABT-751 in the subject is at least 2 μM for 4-48 hours before delivering ionizing radiation to the subject.

11. The method of claim 1, wherein the treatment further comprises administering a further (bio) pharmaceutical agent to the subject.

12. The method of claim 1, wherein the brain tumor is a primary brain tumor, or a secondary brain tumor.

13. The method of claim 1, wherein the primary brain tumor is selected from the group consisting of astrocytomas, meningiomas, oligodendrogliomas, medulloblastomas, ependymomas, craniopharyngiomas, gliomas, central nervous system lymphomas, chordomas, pineoblastomas and schwannomas.

14. The method of claim 12, wherein the secondary brain tumor is a tumor that has spread from a different area in the subject's body selected from the group consisting of pulmonary tumor, breast tumor, genitourinary tract tumor, bone tumor, skin tumor, head tumor, neck tumor, meroblastic tumor, gastrointestinal tumor, colorectal tumor, pancreatic tumor, hematopoietic tumor and lymphoid tissue tumor.

15. The method of claim 1, wherein the subject is a human.

16. A method for the treatment of a brain tumor in a subject, the method comprising administering to said subject an effective amount of ABT-751 and delivering an effective amount of ionizing radiation to said subject.

17. The method of claim 2, wherein administering ABT-751 to the subject is performed at least 6 hours before delivering ionizing radiation to the subject.

18. The method of claim 2, wherein administering ABT-751 to the subject is performed at most 48 hours before delivering ionizing radiation to the subject.

19. The method of claim 3, wherein administering ABT-751 to the subject is performed 6-8 hours before delivering ionizing radiation to the subject.

20. The method of claim 11, wherein the (bio) pharmaceutical agent is an antibody or an alkylating agent.

* * * * *